US012564185B2

(12) United States Patent
Kramer

(10) Patent No.: US 12,564,185 B2
(45) Date of Patent: Mar. 3, 2026

(54) AUTOMATIC OPTIMIZING PEST CONTROL SUBSTANCE DELIVERY SYSTEM

(71) Applicant: SIS Development, Inc., Salem, OR (US)

(72) Inventor: Richard A. Kramer, Salem, OR (US)

(73) Assignee: SIS Development, Inc., Salem, OR (US)

( * ) Notice: Subject to any disclaimer, the term of this patent is extended or adjusted under 35 U.S.C. 154(b) by 0 days.

(21) Appl. No.: 18/458,568

(22) Filed: Aug. 30, 2023

(65) Prior Publication Data

US 2024/0260565 A1     Aug. 8, 2024

Related U.S. Application Data

(60) Provisional application No. 63/483,166, filed on Feb. 3, 2023.

(51) Int. Cl.
*A01M 25/00*          (2006.01)
(52) U.S. Cl.
CPC ................................. *A01M 25/004* (2013.01)
(58) Field of Classification Search
CPC ........................... A01M 25/004; A01M 1/2005
USPC ........................................................... 43/131
See application file for complete search history.

(56) References Cited

U.S. PATENT DOCUMENTS

| | | |
|---|---|---|
| 3,485,868 A | 12/1969 | Eddy et al. |
| 3,798,318 A | 3/1974 | Wright |

| | | |
|---|---|---|
| 3,803,753 A | 4/1974 | Feigin et al. |
| 3,912,810 A | 10/1975 | Eddy et al. |
| 4,285,468 A | 8/1981 | Hyman |
| 4,302,899 A | 12/1981 | DeHart |
| 4,551,941 A | 11/1985 | Schneidmiller |
| 4,667,430 A | 5/1987 | Ziese, Jr. |
| 4,682,715 A | 7/1987 | Reeves |
| 4,773,177 A | 9/1988 | Gray et al. |
| 4,794,724 A | 1/1989 | Peters |
| 4,835,900 A | 6/1989 | Shifflett |
| 4,851,218 A | 7/1989 | Hildebrandt et al. |
| 4,858,374 A | 8/1989 | Clemons |
| D306,061 S | 2/1990 | Cutter |
| 4,923,119 A | 5/1990 | Yamamoto et al. |
| D308,564 S | 6/1990 | Wefler |

(Continued)

FOREIGN PATENT DOCUMENTS

| | | |
|---|---|---|
| CN | 101427659 B | 6/2011 |
| CN | 109482098 A | 3/2019 |

(Continued)

*Primary Examiner* — Timothy D Collins
*Assistant Examiner* — Maria E Graber
(74) *Attorney, Agent, or Firm* — Schwegman Lundberg & Woessner, P.A.

(57) ABSTRACT

Automated pest control systems and methods can use information (including input information based on, but not limited to, for example, one or more of the season(s), temperature trend(s) over a period of time(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information) to optimize the effectiveness of the delivery of pest control substances over a period of time.

23 Claims, 17 Drawing Sheets

(56) References Cited

U.S. PATENT DOCUMENTS

| | | | |
|---|---|---|---|
| 4,981,106 A * | 1/1991 | Nagatomo ........... A01K 5/0275 |
| | | | 222/650 |
| 5,176,103 A * | 1/1993 | Reid .................... A01K 5/0291 |
| | | | 119/51.13 |
| 5,209,010 A | 5/1993 | Vickery |
| 5,220,741 A | 6/1993 | Burgeson |
| 5,263,274 A | 11/1993 | Speed |
| 5,305,541 A | 4/1994 | Simpson |
| 5,361,527 A | 11/1994 | Burgeson |
| 5,452,539 A | 9/1995 | Kurosawa et al. |
| 5,501,033 A | 3/1996 | Wefler |
| 5,522,172 A | 6/1996 | Clark |
| 5,557,880 A | 9/1996 | Schneidmiller |
| 5,939,061 A | 8/1999 | Vail et al. |
| 5,971,208 A | 10/1999 | Kennedy |
| 6,083,498 A | 7/2000 | Landolt |
| 6,088,948 A | 7/2000 | Rønnau |
| 6,109,537 A | 8/2000 | Heath |
| 6,209,252 B1 | 4/2001 | McGough |
| 6,245,327 B1 | 6/2001 | Faehl |
| D451,573 S | 12/2001 | Clark, III et al. |
| 6,374,536 B1 | 4/2002 | Washburn |
| 6,592,104 B2 | 7/2003 | Cox |
| 6,652,846 B2 | 11/2003 | Long |
| 6,740,319 B2 | 5/2004 | Aldrich |
| 6,766,251 B2 | 7/2004 | Mafra et al. |
| 6,910,298 B2 | 6/2005 | Schneidmiller |
| 7,051,472 B1 | 5/2006 | Kelly |
| 7,108,199 B1 | 9/2006 | Brown |
| D561,297 S | 2/2008 | Schneidmiller |
| 7,389,943 B2 | 6/2008 | Jaworski |
| 7,412,797 B1 | 8/2008 | Hiscox |
| 7,530,195 B2 | 5/2009 | Müller et al. |
| 7,656,300 B2 | 2/2010 | Rønnau |
| 7,690,540 B1 | 4/2010 | Owens |
| 7,719,429 B2 | 5/2010 | Barber et al. |
| 7,757,428 B2 | 7/2010 | Lovett |
| 7,886,481 B2 | 2/2011 | Schneidmiller |
| 7,987,629 B2 | 8/2011 | Harper |
| 8,056,282 B2 | 11/2011 | Schneidmiller |
| 8,430,337 B2 * | 4/2013 | Pearce, III .......... A01M 7/0014 |
| | | | 239/69 |
| 8,484,887 B2 | 7/2013 | Schneidmiller et al. |
| 8,510,984 B2 | 8/2013 | Burgeson |
| 8,677,678 B2 | 3/2014 | Schneidmiller et al. |
| 8,683,738 B2 * | 4/2014 | Pryor .................. A01M 25/004 |
| | | | 43/131 |
| 8,739,455 B2 | 6/2014 | Burgeson |
| 8,739,457 B1 | 6/2014 | Key |
| 8,925,905 B2 | 1/2015 | Vieira |
| 8,973,299 B2 | 3/2015 | Durand |
| 9,015,988 B2 | 4/2015 | Zhang et al. |
| 9,044,770 B1 * | 6/2015 | Eyring .................. A01M 29/30 |
| 9,108,782 B2 | 8/2015 | Luc et al. |
| 9,351,483 B2 | 5/2016 | Fritzbøger |
| 9,468,204 B2 | 10/2016 | Bond et al. |
| 9,615,566 B2 | 4/2017 | Bond et al. |
| 9,675,062 B1 | 6/2017 | Kuhn et al. |
| D791,905 S | 7/2017 | Parent et al. |
| D818,078 S | 5/2018 | Zhang et al. |
| D823,426 S | 7/2018 | Chapin et al. |
| 10,085,133 B2 | 9/2018 | Borth et al. |
| 10,226,039 B2 | 3/2019 | Buchstaller et al. |
| 10,440,896 B2 | 10/2019 | Skinner |
| D871,540 S | 12/2019 | Chapin et al. |
| 10,842,145 B2 | 11/2020 | Daly, Jr. |
| 10,869,470 B2 | 12/2020 | Bittlinger et al. |
| D919,742 S | 5/2021 | Chapin et al. |
| 11,027,244 B2 | 6/2021 | Cink |
| 11,073,801 B2 | 7/2021 | Reid et al. |
| 11,076,578 B2 * | 8/2021 | Luttrell ................ A01K 5/0291 |
| 11,083,183 B2 * | 8/2021 | Deering ................ G06F 16/953 |
| 11,140,892 B2 | 10/2021 | Bittlinger et al. |
| 11,147,256 B2 * | 10/2021 | Dlamini ................. G16H 50/80 |
| 11,241,007 B2 | 2/2022 | Burgeson et al. |
| 11,712,022 B2 * | 8/2023 | Zhu ...................... A01K 5/0291 |
| | | | 119/51.11 |
| 11,730,161 B2 * | 8/2023 | Luttrell ............... A01M 25/004 |
| | | | 43/131 |
| 2005/0066905 A1 * | 3/2005 | Morosin ............. A01K 5/0291 |
| | | | 119/51.02 |
| 2005/0189433 A1 | 9/2005 | Burgeson |
| 2007/0074447 A1 * | 4/2007 | Kalogroulis .......... A01M 1/106 |
| | | | 43/107 |
| 2008/0104882 A1 * | 5/2008 | Bernard ............... A01M 1/2011 |
| | | | 43/131 |
| 2008/0175813 A1 | 7/2008 | Kovacs |
| 2008/0256843 A1 | 10/2008 | Hack et al. |
| 2008/0289580 A1 * | 11/2008 | Krishnamurthy .... A01K 5/0291 |
| | | | 119/51.11 |
| 2009/0031608 A1 | 2/2009 | Burgeson |
| 2009/0081154 A1 | 3/2009 | Hiscox |
| 2009/0202468 A1 | 8/2009 | Ripa Schaul |
| 2011/0030266 A1 | 2/2011 | Roy et al. |
| 2011/0165115 A1 | 7/2011 | Zhang et al. |
| 2011/0283600 A1 | 11/2011 | Harper |
| 2012/0280055 A1 | 11/2012 | Schneidmiller et al. |
| 2013/0129667 A1 | 5/2013 | Ripa Schaul |
| 2013/0177455 A1 | 7/2013 | Kamen et al. |
| 2014/0053452 A1 | 2/2014 | Hall, Jr. |
| 2014/0215900 A1 | 8/2014 | Parent et al. |
| 2014/0283435 A1 * | 9/2014 | Galeb .................... A01M 1/106 |
| | | | 43/107 |
| 2016/0007564 A1 * | 1/2016 | Ma ........................ A01K 5/0114 |
| | | | 119/57.1 |
| 2016/0242405 A1 | 8/2016 | Zhang et al. |
| 2017/0035025 A1 * | 2/2017 | Oates ................... A01K 5/0275 |
| 2017/0238503 A1 * | 8/2017 | Deritis ................ A01K 5/0275 |
| 2017/0245488 A1 | 8/2017 | Zhang et al. |
| 2017/0273290 A1 * | 9/2017 | Jay ........................ A01M 1/026 |
| 2018/0249699 A1 | 9/2018 | Daly, Jr. |
| 2019/0075781 A1 | 3/2019 | Redmayne |
| 2019/0281805 A1 * | 9/2019 | Jaffrey .................. A01M 29/12 |
| 2020/0323190 A1 | 10/2020 | Chapin et al. |
| 2020/0396959 A1 * | 12/2020 | Bahr .................... A01K 5/0291 |
| 2021/0212310 A1 | 7/2021 | Wells |
| 2022/0192171 A1 * | 6/2022 | Ots ........................ A01M 1/026 |
| 2023/0354477 A1 * | 11/2023 | Turner .................... H05B 3/26 |
| 2023/0384198 A1 * | 11/2023 | Wolf .................... G08B 29/145 |

FOREIGN PATENT DOCUMENTS

| | | |
|---|---|---|
| CN | 108719224 B | 1/2021 |
| CN | 109788742 B | 10/2021 |
| CN | 112970649 A | 10/2022 |
| CN | 114794062 B | 1/2023 |
| EP | 0203413 A1 | 12/1986 |
| EP | 0897263 B1 | 2/1999 |
| EP | 2854524 B | 5/2017 |
| JP | 3218517 U | 10/2018 |
| JP | 3222025 U | 7/2019 |
| KR | 100795435 B1 | 1/2008 |
| WO | 1999045772 A1 | 9/1999 |
| WO | 2002043481 A1 | 6/2002 |
| WO | 2003013242 A | 2/2003 |
| WO | 2006044382 A2 | 8/2006 |
| WO | 2010077370 A1 | 7/2010 |
| WO | 2011084241 A1 | 7/2011 |
| WO | 2012021531 A9 | 2/2012 |
| WO | 2012145642 A3 | 10/2012 |
| WO | 2016062991 A1 | 10/2013 |
| WO | 2018050393 A1 | 3/2018 |
| WO | 2020175999 A1 | 9/2020 |
| WO | 2020201241 A1 | 10/2020 |
| WO | 2020216428 A1 | 10/2020 |
| WO | 2021152519 A1 | 8/2021 |

* cited by examiner

20

22

Attractant

21

34

30

33

32

31

50

52

AUTOMATIC OPTIMIZING PEST CONTROL SUBSTANCE DELIVERY SYSTEM

CROSS-REFERENCE TO RELATED APPLICATION

This application claims priority under 35 U.S.C. § 119 to U.S. Provisional Application No. 63/483,166, filed Feb. 3, 2023, the entire disclosure of which is incorporated herein by reference.

TECHNICAL FIELD

The present disclosure relates to an intelligent and automatic adaptive insect/rodent/pest elimination system, method, and apparatus, for the determination of an optimally selected substance(s) for the elimination of insects/rodents/pests.

BACKGROUND

While much has been done to improve the characteristics of substances used in the elimination of insects/rodents/pests, such as improvements in attractants and baits to lure insects/rodents/pests, each substance has a limited exposed shelf life related to how long the substance remains effective. For example, in spite of many prior art solutions that have focused on improving the effectiveness of attractants/baits, the prior art fails to be adaptive to, in an intelligent and automatic manner, optimally attract insects/rodents/pests over a period of time (such as an entire season).

Many conventional pest control systems fail to address the limited shelf-life, loss of potency over time, ability to automatically adjust for instinctual changes of the targeted pest(s) over time, and the need for replenishment. Moreover, such products in the market realistically only provide weeks of attraction, and even then, the potency when the attractant is originally exposed, rapidly decreases in its effectiveness in a matter of days and further does not adapt to the instinctual changes for the targeted insects/rodents/pests. These conventional pest control systems lack the ability to automatically compensate for instinctual changes of the targeted pest(s) over time among other limitations.

Other conventional pest control systems are unable to intelligently determine and then automatically select what is the optimal substance to deliver based on input information to determine critical insects/rodents/pests instinctual information, such as input information used to intelligently determine the season. These conventional pest control systems are further hindered by impracticality due to, for example, size and other implementation aspects with respect to retrofitting and/or replacing existing home and commercial pest control devices so that such devices can fit, for example, under a sink, under an appliance, or some other discrete indoor or outdoor location.

As a result of these shortcomings, homeowners, pest control professionals, and maintenance personnel are left with the dilemma of continually having to manually replace substances due to the loss of potency of the substances once exposed. Further ineffectiveness and guesswork are commonplace due to independent seasonal change(s), change(s) in average temperature(s), change(s) in the length of day(s), accountancies for geographical location, unrealized changes in effectiveness, as well as other input information that can be used.

Thus, a cost-effective, modularizable, retrofittable system, method, and apparatus, that intelligently determines and then automatically selects one or more optimal substance(s) for the targeted elimination of such insects/rodents/pests is needed.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional pest control systems by providing a cost-effective, modularizable, retrofittable system, method, and apparatus, that intelligently determines and then automatically selects one or more optimal substance(s) for the targeted elimination of such insects/rodents/pests, such as ants, yellowjackets, wasps, roaches, mice, and other insects/rodents/pests over a time span wherein the instincts and/or feeding patterns of the insects/rodents/pests change based on sensed input information.

Embodiments disclosed herein address this problem by providing an automated system, method, and apparatus that optimally selects a substance for the elimination of insects/rodents/pests, based on input information. Such input information includes, but is not limited to, one or more of the season(s), temperature trend(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information.

In one embodiment, a pest control substance delivery device may include a first microchamber that is configured to hold a first pest attractant and a second microchamber that is configured to hold a second pest attractant. The second pest attractant may be different from the first pest attractant. The pest control substance delivery device may also include an actuator, that is configured to actuate an aperture assembly, that in turn allows access to the first microchamber when a first condition is met and allows access to the second microchamber when a second condition is met. Finally, the pest control substance delivery device may include a sensor that collects data for determining whether the first condition is met and whether the second condition is met.

In some embodiments, the first and second pest attractants may be poisons. In some embodiments, at least one of the first and second pest attractants may be a solid. In other embodiments, at least one of the first and second pest attractants may be a liquid.

In some embodiments, the pest control substance delivery device may include a memory configured to store data defining the first condition and the second condition. In some embodiments, the pest control substance delivery device may include a receiver configured to receive data defining the first condition and the second condition. In these embodiments, the receiver may be configured to receive data defining the first condition and the second condition over a wired or wireless communication link.

In some embodiments, at least one of the first and second conditions may be a specified season of a year and the data collected by the sensor may be an actual season of the year. In other embodiments, at least one of the first and second conditions may be a specified ambient temperature range and the data collected by the sensor may be an actual ambient temperature. In other embodiments, at least one of the first and second conditions may be a specified temperature trend over a period of time and the data collected by the sensor may be an actual temperature trend over the period of time. In other embodiments, at least one of the first and second conditions may be a specified number of light hours in a day and the data collected by the sensor may be an actual number of light hours in a day. In other embodiments, at least one of the first and second conditions may be a specified change in a number of light hours in a day over a period of time and the data collected by the sensor may be an actual change in a number of light hours in a day over the period of time.

In some embodiments, the first condition may be a specified amount of time that the aperture assembly allows access to the first microchamber and the data collected by the sensor may be an actual amount of time that that the aperture assembly has allowed access to the first microchamber. In these embodiments, the specified amount of time may be based on a shelf-life of the first pest attractant.

In some embodiments, the first condition may be an indoor use of the pest control substance delivery device, the second condition may be an outdoor use of the pest control substance delivery device, and the data collected by the sensor may be whether the pest control substance delivery device is in an indoor or outdoor environment. In other embodiments, at least one of the first and second conditions may be a specified geographic location of the pest control substance delivery device and the data collected by the sensor may be an actual geographic location of the pest control substance delivery device. In other embodiments, at least one of the first and second conditions may be a presence of a specified pest species and the data collected by the sensor may be an actual presence of pest species around the pest control substance delivery device.

In some embodiments, the first pest attractant may be an optimal attractant for a target pest species during a first active lifecycle of the target pest species and the second pest attractant may be an optimal attractant for the target pest species during a second active lifecycle of the target pest species. In other embodiments, the first pest attractant may be an attractant for a first target pest species the second pest attractant may be an attractant for a second target pest species.

In another embodiment, a pest control substance delivery device may include a first microchamber that is configured to hold a first pest attractant, wherein access to the first microchamber is selectively unsealed when a first condition is met and sealed when a second condition is met. The pest control substance delivery device may also include a second microchamber that is configured to hold a second pest attractant, wherein access to the second microchamber is selectively unsealed when a third condition is met and sealed when a fourth condition is met. The pest control substance delivery device may also include a sensor that collects data for determining whether the first, second, third, and fourth conditions are met and an actuator, that is configured to actuate an aperture assembly. The aperture assembly may be configured to automatically unseal access to the first microchamber when the first condition is met, automatically seal access to the first microchamber when the second condition is met, automatically unseal access to the second microchamber when the third condition is met, and automatically seal access to the second microchamber when the fourth condition is met.

Those skilled in the art should realize that the above embodiments can readily be combined, in any combination, such that equivalent constructions are formed that do not depart from the spirit and scope of the invention in its broadest form.

BRIEF DESCRIPTION OF THE DRAWINGS

Embodiments will be described and explained with additional specificity and detail through the use of the accompanying drawings, in which.

DETAILED DESCRIPTION

Figure 1:
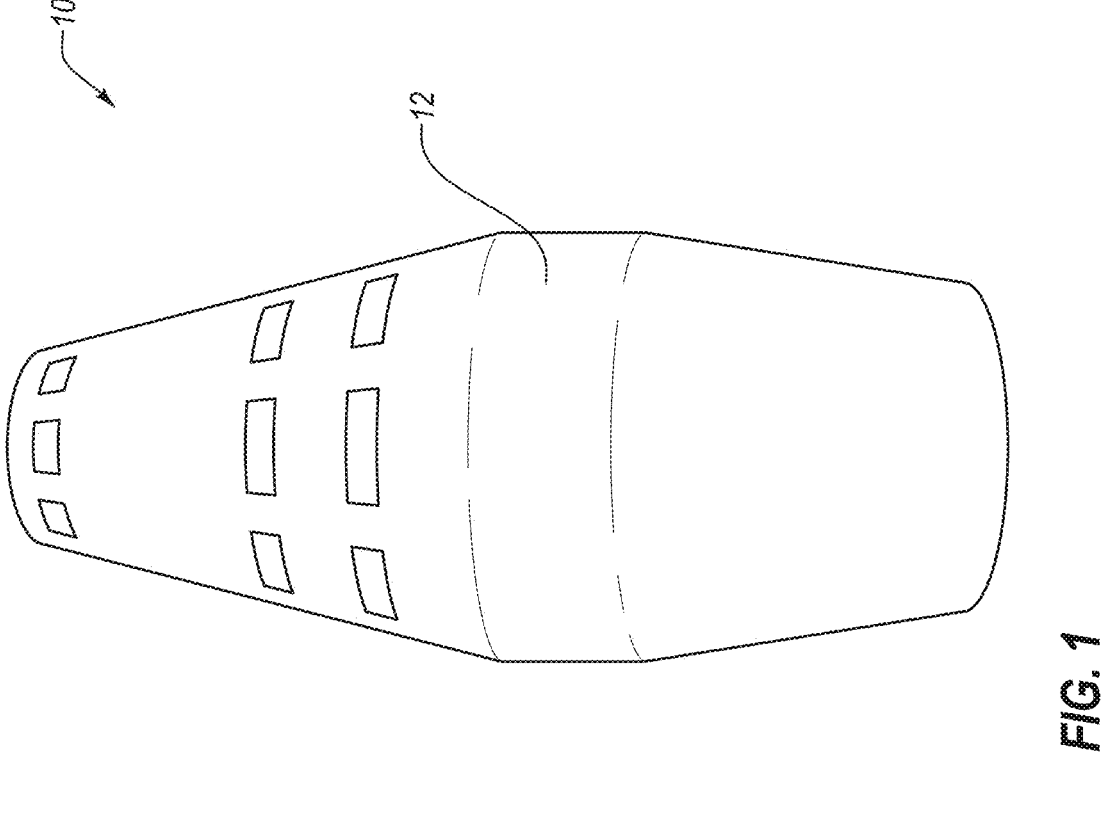
FIGS. 1-6 illustrate various conventional pest control devices and components thereof.
Figure 1:
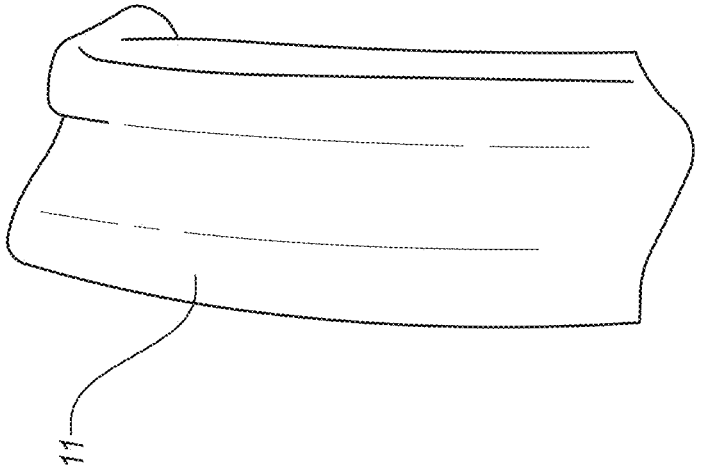

Embodiments disclosed herein optimize, for example, for instinctual insect/rodent/pest seasonal changes, and/or deterioration of the potencies based on the exposed shelf-life of the substances used to attract and/or poison such insects/rodents/pests. The present disclosure includes intelligent extensibility for the use of information (including input information based on, but not limited to, for example, one or more of the season(s), temperature trend(s) over a period of time(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information), to optimize the effectiveness of the delivery of substances over a period of time. The sophistication of embodiments of the present disclosure may further employ artificial intelligence, machine learning, trend detection, wireless communications, a user interface, and other aspects as described herein. Additionally, delivery services and systems of the present disclosure are agnostic to the substance type (e.g., solid, liquid) and are further able to unseal and expose one or more sealed optimal substance(s) in a practical manner.

Embodiments disclosed herein may include (1) one or more sealed microchambers as part of an overall structure, (2) one or more substances contained within the one or more microchambers, (3) a movable element, motor, or other to electro and/or mechanical method—to unseal and expose to the atmosphere—the sealed one or more microchambers, (4) an electromechanical energy source that may further include a battery or solar powered source, and (5) one or more sensors/inputs that provide input information including, but not limited to, one or more of, for example: (i) season(s) (ii)

temperature trend(s) (iii) length of day(s), (iv) change(s) in length of day(s) over a period of time(s), (v) the deterioration of the potencies of substance(s) based on the exposed shelf-life and/or spoilage of the substance(s), (vi) indoor versus outdoor usage, (vii) geographical location, (viii) species/subspecies, (ix) or other input information that is used to automatically adapt to one or more instinctual insect(s)/rodent(s)/pest(s) changes over a period of time.

As such, the structure that includes one or more microchambers may include, for example, one or more substances thereby exposing one or more types of substances in the spring, and one or more of another substance (for example) in the summer (or early summer, versus late summer, etc.), in a manner to optimize attraction based on varying pest feeding/instinctual patterns, whereby the time reference is adjustable and/or detectable. While embodiments of the pest control substance delivery device may be automatic, in some embodiments some or all of the input information may be obtained based on initial configuration information, either stored or supplied based on initial settings, including initial setting and/or configuration from the user or other individual, or memory, such as predefined or calculated parameters. For example, an initial adjustment(s) and/or configuration(s) may include a setting based on an index or other setting with respect to a geographical zone setting, and/or initial time/season setting (e.g., the month such as June or 6, or season such as fall, etc.), and/or indoor versus outdoor use, and/or selection of a species/subspecies, and/or be based on any other adjustment or sensed input information used to determine one or more optimal substance(s) to expose. The adjustment element for input information may comprise any known means for making a manual adjustment or state (e.g., switch, dial, adjustment, configuration, setting of a position including the position of the microchamber assembly and/or aperture and/or other physical components relative to an index, actuator, action, pull tab to make an electrical connection, or other manual method or methods), sensor input(s) such as from a daylight detector(s) (including via a solar cell), temperature sensor(s), other sensor(s), wired input(s), and/or wireless input(s). Such input information is used for the abovementioned exemplary seasonal, time-based, geographical location, species/subspecies, and/or another adjustment as part of the determination and optimized selection of a substance with respect to one or more targeted pests.

It should be noted that herein, the terms "substance," "attractant," "poison," "solution," "agent," "bait," and other like terms including their derivative forms (both singular and plural), are considered interchangeable. References to the terms "insect," "rodent," "pest," "animal," and other like terms including their derivative forms (both singular and plural) are considered interchangeable herein.

References to "time" herein may include, but is not limited to, one or more seasons, months, weeks, days, or other unit(s) of time. Time may be based on a relative or an absolute time index, or may include another index including one that may further utilize information including, but not limited to, geographical location to derive the time, length of day(s), change(s) in the length of day(s), or other information.

References to "temperature" herein may include, but are not limited to, a real-time measured temperature, a previously measured temperature, an average measured temperature over a period of time, a measured minimum and/or maximum temperature measured at a certain time, and/or a temperature that is measured over a period of time, a calculation using multiple temperatures, and/or any combination thereof.

Reference to "aperture" herein is used in the context of an opening (or open space) used to allow one or more selected substance(s) to be exposed to the atmosphere. For example, an aperture exposes one or more substances for the attracting and/or baiting of a pest. References to an aperture include, but are not limited to, a completely unobstructed opening. References to an aperture may also include, but are not limited to, a partially obstructed aperture with a structure (or structures) to protect, and thus prevent, direct contact with one or more substance(s). Such structure(s) to prevent contact may comprise (for example) a frame or other structure with vents or slits, a cage, a shroud, screen, mesh, or other obstruction that allows pests to sense the substance(s) through a partially obstructed aperture. For example, an aperture can be covered with solid plastic with slits, a metal or plastic cage, or by wire mesh. As another example, an aperture via a turret opening can be protected via a wire mesh, or other protective covering, or no covering at all. Overall, the "aperture" may include any electromechanical element(s), for example, but not limited to, a cutout, movable wall/structure, diaphragm, iris, reduction/elimination of a film, void in a sealing gel, or other means to create an opening and/or exposure to the atmosphere. Moreover, the use of the term "aperture" is not limited to a single "aperture" and/or opening but rather, may comprise multiple apertures, or a single aperture used to expose multiple substances, or any combination. For example, each microchamber may have a separate aperture, or a mechanism may be used to employ a single aperture for the exposure of one or more microchambers, or any combination.

Use of the word "input," "input information," "sensor input," and similar related terms herein may be, for example, an analog input signal and/or value, a physical property or value, a digital input signal or value, a mechanical input, other well known in the art inputs, or any combination. The input information may also include, or be combined with, sensed (and/or measured) input information via one or more physical sensors, settings (including manual settings, initial settings, etc.), predefined or calculated parameter(s) such as a value stored in an optional memory, physical states (including a configuration, a switch position, a position of an actuator, etc.), positions (including the position of the microchamber assembly and/or aperture and/or aperture assembly), or other physical components/states/values, action states (including a pull tab that is used to make an electrical connection, position of an actuator), or other method or methods used to generate (or make readable) input information. Moreover, the input information may be obtained automatically, via one or more sensors/inputs, wired inputs, or wireless inputs. Input information settings may also be obtained in real-time, and/or as an initial setting, and/or in any combination of real-time and past input information. Moreover, the input information may be a single input or a combination of inputs to comprise overall input information. For example, multiple inputs can be combined to form a composite signal, state, or value, and may comprise any combination of automatic, manual, sensor, and/or physically related inputs. Inputs may also be received manually from, in some cases, a user associated with the delivery system. For example, data relating to a target species, an anticipated location of the delivery system (geographic location or indoor/outdoor use), etc. may be input manually.

References to "geographical" and/or "location" and similar terms herein can either be an absolute location such as, for example, GPS coordinates, an address, a zone (including a time zone, a climate zone, a zone for a type of pest), or other information to identify a location, or can be relative based on, for example, elevation/altitude, or some other relative location.

References to "season" herein can relate to "winter," "spring," "summer," and "fall" seasons, or a subset thereof, in an absolute manner. The use of "season" herein may also be relative and changing from year to year or over some other period of time. For example, a "season" can relate to warmer (or colder) months, or some other environmental pattern over a period of time, that can, but is not limited to, varying from year to year (e.g., a longer summer due to persistently hot weather, etc.). Thus, a "season" can be either absolute seasons with respect to specific dates and/or times (e.g., spring, summer, winter, fall), or other information (such as length of day(s)), or can be relative based on other factors (such as temperature) and/or even vary in the number of seasons that occur based on input information. For example, there may be only two seasons-one season may be for colder lengths of time, while another season may be for warmer lengths of time. As yet another example, "time" and even "season" can span or cross over more than one year.

References to "seal," "seal[s]," "seal[ing]," "seal[ed]" and the like, for example, concerning a "seal[ed] microchamber" or one or more "seal[ed]" substance(s) and the like, may be hermetically sealed (e.g., airtight sealed), but does not necessarily include, hermetically sealed. Moreover, the "seal [ing]" and like terms can relate to the separation of one microchamber's contents from another microchamber's contents, or other separation, related to any type/form of substance (e.g., a solid, gas, liquid, or any combination), or no substance at all (e.g., an empty microchamber). Further, the "seal[ ]" may be via sealing of one or more of the microchambers, individually, or as a whole, or the contents within the microchambers may be, for example, individually sealed. The sealing can also be enacted or aided by the use of films or membranes and other sealing methods known in the art. Seal[ing] may also be enacted using one or more seals comprising, for example (but limited to), an O-ring, ring, silicon, gel, gasket, edge of a film/membrane, plastic, or other known methods for causing a seal, in any combination.

References to "electro and/or mechanical" or "electromechanical" or similar terms herein may refer to but are not limited to, mechanical elements, such as a wind-up device and/or mechanical logic, electrical elements such as electrical (including electronic) component(s) or device(s) that enact an electric field, heat, analog circuitry, digital circuitry, or any combination of both electrical and mechanical elements. Examples include, but are not limited to one or more actuators for actuating one or more apertures and/or aperture assemblies to unseal one or more microchambers. Examples include but are not limited to one or more of a drive mechanism, a direct drive motor, a motor with gears (or belt, shaft, or other drive elements), a clock mechanism, a push or pull element, analog and/or digital electronics, a heating element, one or more elements related to or comprising a diaphragm, one or more elements related to or comprising an iris aperture, a rotating element with one or more fixed apertures, other types of electro and/or mechanical elements related to or comprising one or more mechanical apertures, any combination of such elements, and/or other electrical or mechanical elements. Moreover, the electromechanical elements may include other components, such as a microprocessor (which may also be referred to as a processor), position sensors, and the like. An electronic (electro) microprocessor and/or other electrical circuits and/or mechanical logic, or any combination may be used to perform processing and/or used to make determinations.

References to "optimal," "optimized," "optimizing," and similar terms, are used in the context of the selection of one or more preferred substance(s) amongst of group of one or more alternatives, wherein the selection can occur in real-time or at some future time. Optimal, in the context of selection, may be qualified by one or more type(s) of substance(s), for example, the selection of a protein-based substance or other substance(s) during late summer as compared to a pheromone-based substance or other substance(s) during the spring. Optimal, in the context of selection, may also be qualified via the selection of an optimal one or more volume(s) and/or amount(s), for example, the selection of a larger sized microchamber and/or larger volume of substance(s) (or different sized substance(s)) to accommodate more ravenous feeding patents and/or different-sized attractants during one season as compared to another season, or based on other input information. The optimal size or volume of an "optimally" selected microchamber may also have no substance at all during pest dormant periods. Optimal, may also be qualified based on freshness, shelf-life, half-life, or other factors relative to one or more substance(s) that that may have decayed in effectiveness as compared to one or more other substance(s) that have, in a relative manner, not decayed in effectiveness. Optimal, may also be qualified based on the type of pest that may vary, as compared to one or more other substance(s) during one season or time period as compared to another season or time period, or based on other input information.

References to "option," "optional" and the like are used in the context that an embodiment may include an alternative to an embodiment, forming [a] distinctly different alternative embodiment(s) that further envelops one or more stated optional aspect(s) (e.g., optional elements, optional components, optional processes, optional methods, etc.). The use of "option" and the like thus provides for an embodiment that does not necessarily include any of the stated one or more optional aspect(s). Further, the use of "option" and the like does not imply that any particular embodiment must necessarily be upgradable to include any optional aspect(s). In short, references to an option and the like can mean that the option can be present, but is not necessarily present, and is not necessarily upgradable to be present. For example, one embodiment of the present disclosure may comprise an aperture used to solely expose a single sealed microchamber with no option and/or alternative implementation present to expose more than one sealed microchamber. Alternatively, among other alternatives as an example, an option to an embodiment (i.e., an alternative to an embodiment) may comprise one or more apertures that may be used to expose more than one sealed substance.

In one embodiment, a pest control substance delivery device automatically selects one or more optimal substance(s) to expose based on at least one parameter via input information that may include, but is not limited to, for example, one or more of the season(s), temperature trend(s) over a period of time(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information to automatically adapt to one or more instinctual insect(s)/rodent(s)/pest(s) changes over a period of time. In one embodiment, the just mentioned input information can be combined with other input information as discussed above with respect to "input information."

In another embodiment, a pest control substance delivery device may be used to set, sense, and/or use (in any combination) input information to determine the optimal substance(s) to select based on, but not limited to, for example, one or more of the season(s), temperature trend(s) over a period of time(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information to automatically adapt to one or more instinctual insect(s)/rodent(s)/pest(s) changes over a period of time. As such, the pest control substance delivery device may use wired or wireless communications to obtain input information and/or use sensors such as one or more of a light sensor (including via a solar cell), a timer and/or time sensor, a temperature sensor, a location sensor, or a combination of sensors to detect or derive the abovementioned input information.

In one embodiment, a communication interface(s) may further include any one of wired or wireless communications including but not limited to analog or digital signals, USB, LANs (Local Area Networks, e.g., 802.11, etc.), PANs (Personal Area Networks, e.g., Bluetooth®, etc.), WANs (Wide-Area Networks, e.g., cellular, etc.), optical/IR (Infrared), Zigbee®, Z-Wave® GPS, satellite, radio waves, direct connection. The communication interface(s) may be used to gather remote or local input information including from, for example, one or more of a light sensor(s), timer and/or time sensor(s), temperature sensor(s), a location sensor(s), or other sensor(s) to detect and/or determine input information used to optimally select a substance(s) for the targeted pest(s).

In one embodiment, one or more of the microchambers are sealed, which may include, but does not necessarily include, hermetically sealing (e.g., airtight sealing). Moreover, the seal[ing] can relate to the separation of one microchamber's contents from another microchamber's contents, or other separation, related to any combination of a solid, gas, liquid, or no substance at all (e.g., an empty microchamber for example while pests are dormant or for shipping purposes). Further, the "seal" may be via sealing of one or more of the microchambers, individually or as a whole, or the contents within the microchambers may be for example, individually sealed. For example, the microchambers may be part of and/or placed within an overall assembly wherein the overall assembly causes the sealing, or the microchambers may be covered (or the contents of the microchambers themselves covered) with a film or membrane that can be punctured or otherwise eliminated, or a film the degrades once exposed, or an aperture that can be used to expose one or more desired substance(s) while retaining one or more other substance(s) in one or more other microchambers as sealed. As another exemplary embodiment, one or more seals may be used to seal one or more microchambers, for example around an aperture, and/or around one or more microchambers, or around an entire (or a portion of the) overall microchamber assembly.

In another embodiment, a pest control substance delivery device may include microchambers and/or apertures that are specifically formed to accommodate specific one or more types of insects/rodents/pests and how they feed and/or are attracted. For example, the edge of one or more structures (which may include one or more microchambers, one or more apertures, or other structures), may be tapered to allow for easy access to a substance by ants at one time of year, and/or another species, for example, roaches at the same time, or another time of year, and/or singularly or any combination. In this embodiment, the size of the microchambers and/or apertures can be further different, for example, to accommodate, more ravenous feeding volumes (or different-sized attractants and/or volumes) during one season as compared to another season.

In one embodiment, a pest control substance delivery device may be made to be retrofittable or adapted to fit in place of baits, replaceable baits, and/or attractant trap cartridges/containers/modules/apparatuses and the like. For example, the overall apparatus may be fashioned to fit within or take the shape of existing yellowjacket trap bait systems (where conventional attractants are now placed.) As yet another example, the pest control substance delivery device can fit within or even replace ant bait systems, or fit within existing traps and/or bait systems for mice or other rodents (e.g., a closable live mouse trap), or fit within or take the shape of other pest control apparatuses.

In another embodiment, a pest control substance delivery device may be made to be retrofittable and/or modular in the sense that an assembly (e.g., containing the microchambers with substances) or other assemblies, can be detached and/or replaced from the pest control substance delivery device. For example, each year an assembly or structure containing the microchambers can be detached and replaced with a new assembly or structure containing new substance(s) within the microchambers. In such an embodiment, the user can retain one or more other assemblies, such as a base that contains a movement assembly and/or power source. Moreover, the power source, which can be a battery, can be replaced.

In another embodiment, a base of a pest control substance delivery device may be hermetically sealed to protect the base from environmental elements so that the pest control substance delivery device may be used outdoors.

In another embodiment, a pest control substance delivery device can have one or more protective guard(s) (which may also be called a shroud herein) to protect aspects of the pest control substance delivery device from access by one or more targeted pest(s), wherein one intended purpose of an exemplary embodiment is to attract a continuum of pests absent of consumption of the substance(s) by the one or more pests. For example, a pest control substance delivery device according to some embodiments can be contained within a frame, cage, shroud, screen, mesh, or other obstruction that allows pests to sense the substance through a (partially obstructed or unobstructed) aperture or apertures. The frame, cage, shroud, screen, or other obstruction can be part of the aperture, part of a cover, be made external to the aperture, or any combination. Another embodiment may include a frame, cage, shroud, screen, mesh, or other obstruction that can be used to protect from humans and/or pests from touching one of the contained substance(s).

In another embodiment, a pest control substance delivery device may include the use of one or more user indicator(s)/user interface(s), such as one or more LED (Light Emitting Diode) indicators or other visual interface(s). As such, the indication may communicate/convey any one of the following conditions, but not limited to, by way of example: error, low battery/low energy, maintenance needed, replacement of substance(s)/assembly needed, replace the structure that includes one or more sealed microchambers, and/or replace any other serviceable part. The indicators can also be used to convey to the user, for example, settings, readings, values, configurations, codes, determined and/or derived information, representation(s) of input information, etc. Such settings may include, for example, the selection of a desired species/subspecies, time, climate zone, or other information.

In another embodiment, a pest control substance delivery device may include a low-cost wired or wireless transmitter (or transceiver) to communicate information to the user, any one of the following conditions, but not limited to, by way of example: error, low battery/low energy, replacement of substance/assembly needed, or other indication. Further, the low-cost wired or wireless transmitter, which may be further combined with a wireless receiver, may communicate information to automatically order supplies, resolve an error, indicate low battery/low energy, indicate the need to replace substance(s), indicate the need to replace the structure that includes one or more sealed microchambers with substance(s), or the need to replace any other serviceable part(s). Moreover, the wired or wireless transmitter (or transceiver) may communicate, locally or remotely, any other user information as discussed above concerning one or more indicator(s), input(s), and/or user interface(s).

In another embodiment, operative elements of a pest control substance delivery device may support a sleep mode, whereas rather than continuous operation, operative elements of the pest control substance delivery device wake up and provide operation for a short interval of time to conserve power/energy.

In another embodiment a motor may be controlled in conjunction with a microprocessor. In this embodiment, the motor may be controlled by analog or digital circuitry absent of a microprocessor.

In another embodiment, the energy source may be solar and further include an energy storage element such as a battery. Moreover, the solar energy source may be used to recharge the battery and further be used for the detection of light levels based on the output voltage of the solar device, such as a solar cell or small solar panel. Thus, for example, the source of solar energy may also be used in conjunction with a microprocessor to detect the length of the day(s), the season(s), or other input information.

In another embodiment, a microprocessor may execute instructions that comprise at least one algorithm that is used to intelligently determine and then automatically select an optimal one or more substance(s) for the targeted elimination of one or more types of insects/rodents/pests. For example, the microprocessor can execute an algorithm to determine aspects of a particular season or determine the start of a season, using input information such as average temperature(s) and/or other input information. Such a determination can then be used to select one or more optimal substance(s) in real-time or at some time in the future. Moreover, the algorithm may include machine learning, artificial intelligence, trend detection, or other adaptable learning aspects.

FIG. 1 shows a typical wasp and/or yellowjacket attractant cartridge device 10. Referring to FIG. 1, an absorbent pad 11 is pretreated with a single attractant substance to attract wasps and/or yellowjackets. The absorbent pad is further packaged and enclosed within cartridge housing 12. As shown in the device depicted in FIG. 1, conventional solutions often offer a single substance, void of substance optimization for the targeted species/subspecies, wherein such optimization may further include optimization for targeted pests based on the season or other factors. Moreover, the substance pretreated onto pad 11 evaporates/dissipates over time and thus loses effectiveness. Another shortcoming with the device 10 is the fact that the attractant used with respect to FIG. 1 is limited to optimally attract certain species at a certain time of year, for example, a queen yellowjacket in the spring, yet is ineffective in optimally attracting, for example, worker yellowjackets in late summer (e.g., wherein in late summer worker yellowjackets preferably seek protein-based baits and/or attractants).

Figure 2:
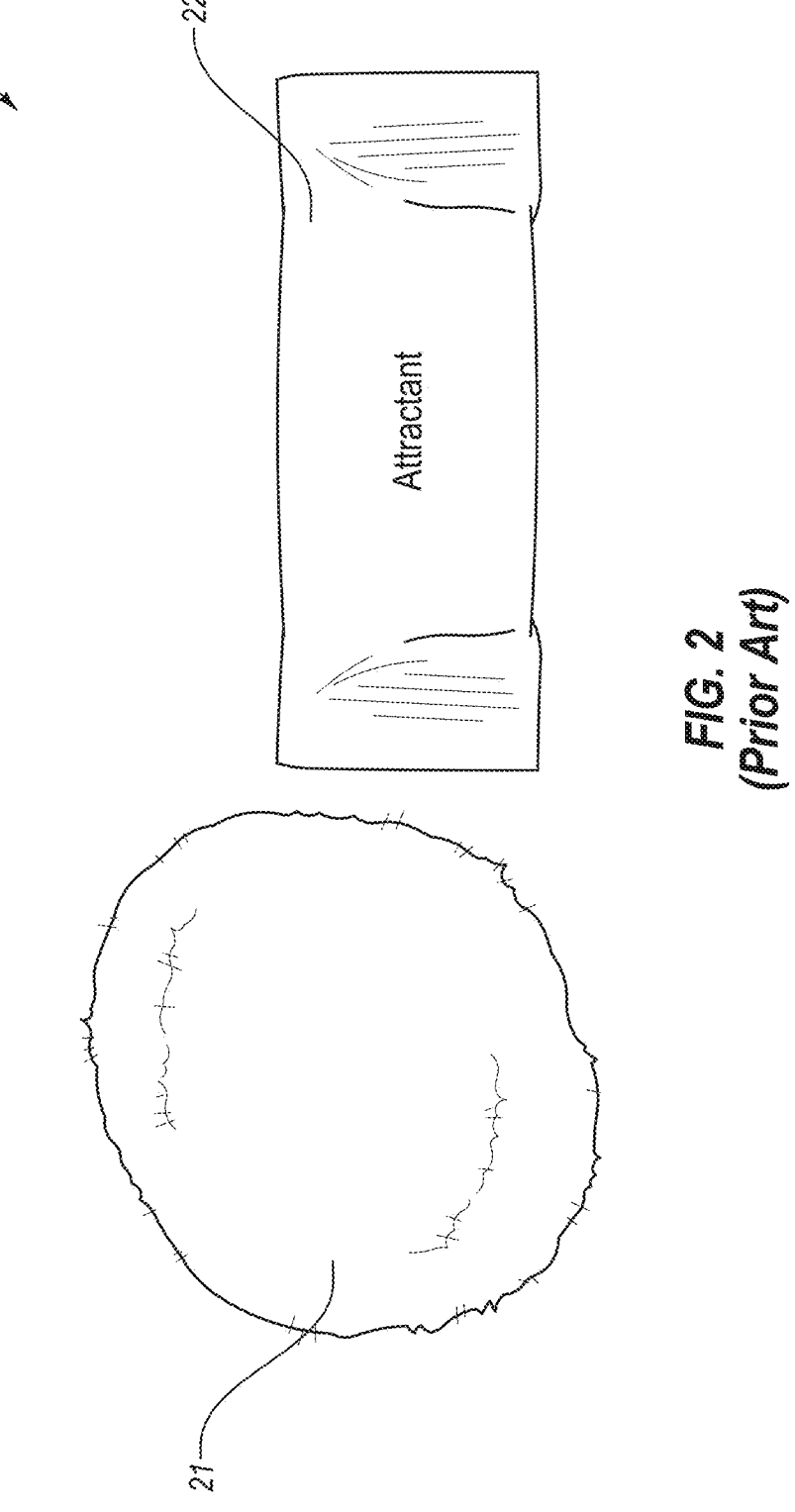

FIG. 2 shows yet another conventional device 20 to attract wasps and/or yellowjackets. To use the device 20 shown in FIG. 2, a user is required to open and pour the contents of a single substance contained within packet 22 onto absorbent material 21. Like the device 10 shown in FIG. 1, the device 20 depicted in FIG. 2 has similar limitations wherein there is no automated manner to optimally select a substance, for example, based on a season or other factors. Moreover, the substance pretreated onto material 21 evaporates/dissipates over time and quickly loses effectiveness. For example, the useful life of the shown attractant, or similar attractants, is only a few weeks.

Figure 3:
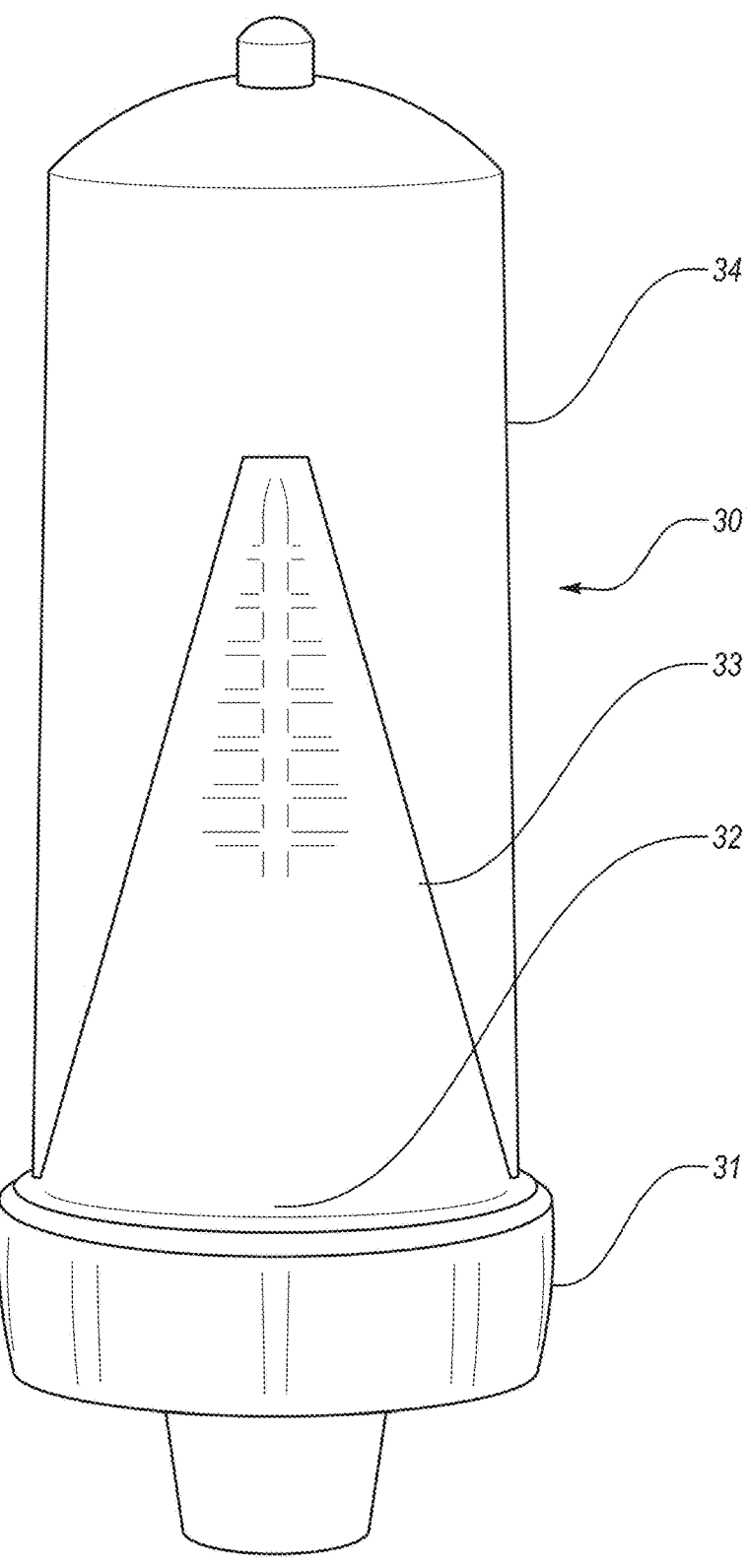

FIG. 3 shows an exemplary conventional wasp and/or yellowjacket trap 30 that requires the user to place within trap 30, a single attractant 32 (such as those shown and described in FIG. 1 and FIG. 2). Specifically, the user is required to, for example, unscrew base 31 and continually place fresh attractant inside the trap 30 (such as at the bottom of the internal inverted cone 33). One skilled in the art would appreciate that placement of an attractant, can alternatively be placed in other places within trap 30 including within outer housing 34 (e.g., at the top of the outer housing 34 via any method for placement including through an opening at the top of outer housing 34, etc.). Thus, because the exemplary trap 30 employs a single attractant 32 that has a limited life span and fails to be an optimal attractant over a period of time (as well as other shortcomings as discussed above), the trap shown in FIG. 3 suffers from the same limitations already mentioned.

Figure 4:
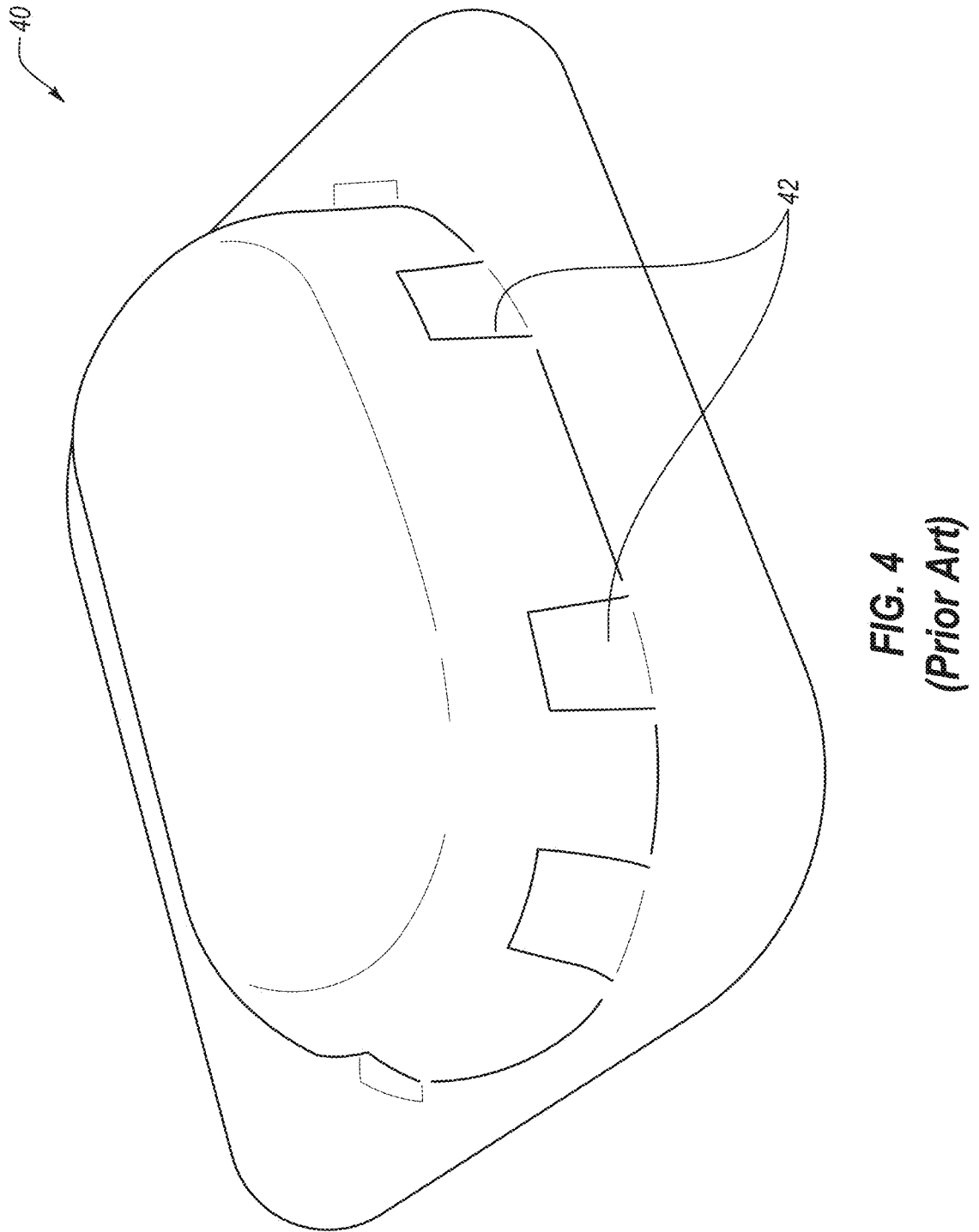

FIG. 4 shows an example of a conventional ant bait station 40 comprising multiple side entryways 42 with bait enclosed within the apparatus. Like other devices discussed above, the useful life of the attractant (e.g., bait and/or poison) is typically said to be effective for up to three months (for indoor use). Overall, the user has no way of knowing the expiration/exhaustion of the bait and/or poison besides noticing the reinfestation of the undesired targeted pests. Moreover, the effectiveness and/or potency of the three months can overlap with a time period such as when the targeted pests go dormant, thus causing unwanted waste, wherein once the pests once again become active, the substance may have already expired.

Figure 5:
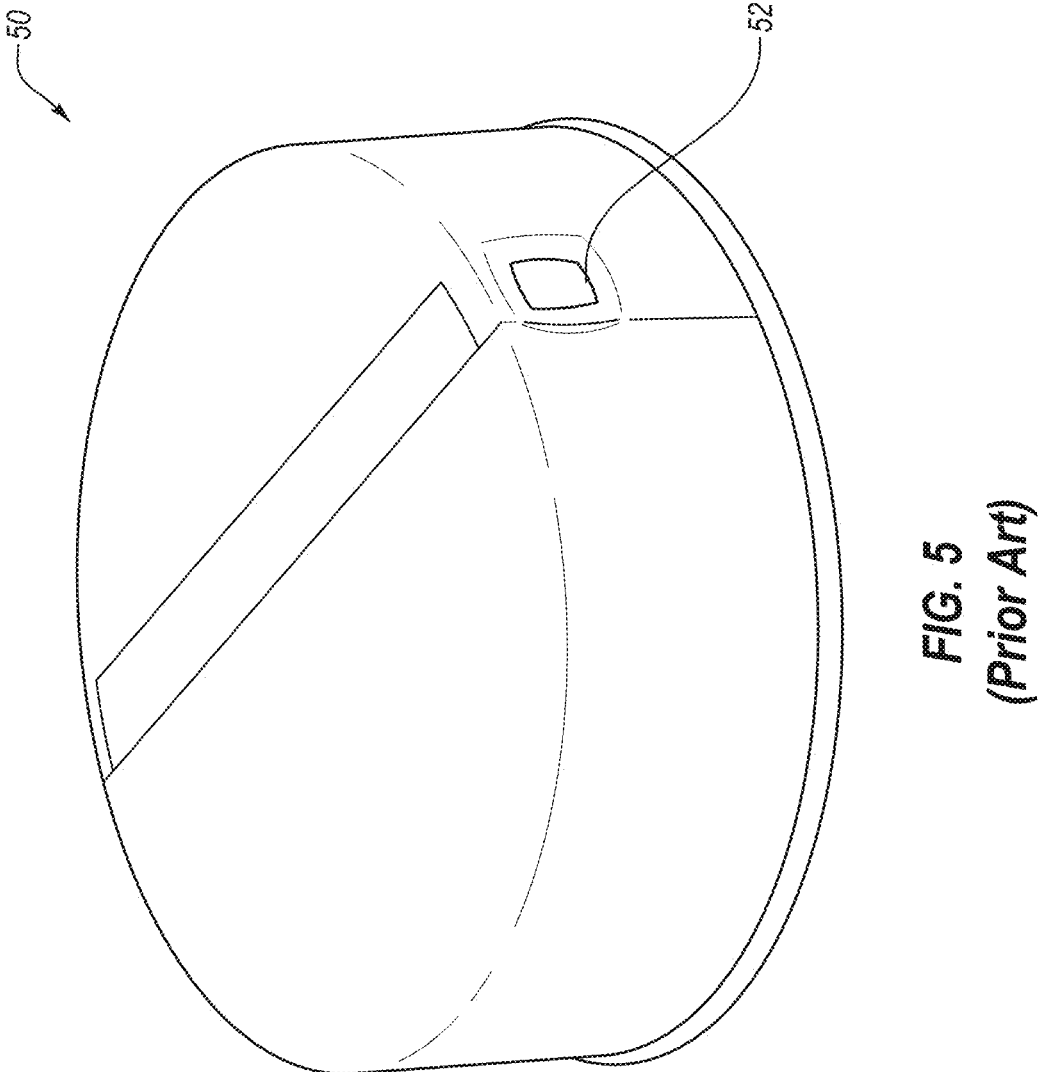

FIG. 5 shows another example of a conventional ant bait station 50 comprising a side entryway 52 with bait and/or poison enclosed within the apparatus. For such solutions, the useful life of the bait and/or poison is said to be typically up to 30 days for indoor/outdoor use. As with other conventional devices, the user has no way of knowing the expiration/exhaustion of the bait and/or poison besides noticing the reinfestation of the undesired targeted pests. Moreover, the effectiveness and/or potency of the 30 days can overlap with a time period as to when the targeted pests go dormant, thus causing unwanted waste, wherein once the pests once again become active, the substance has already expired.

Figure 6:
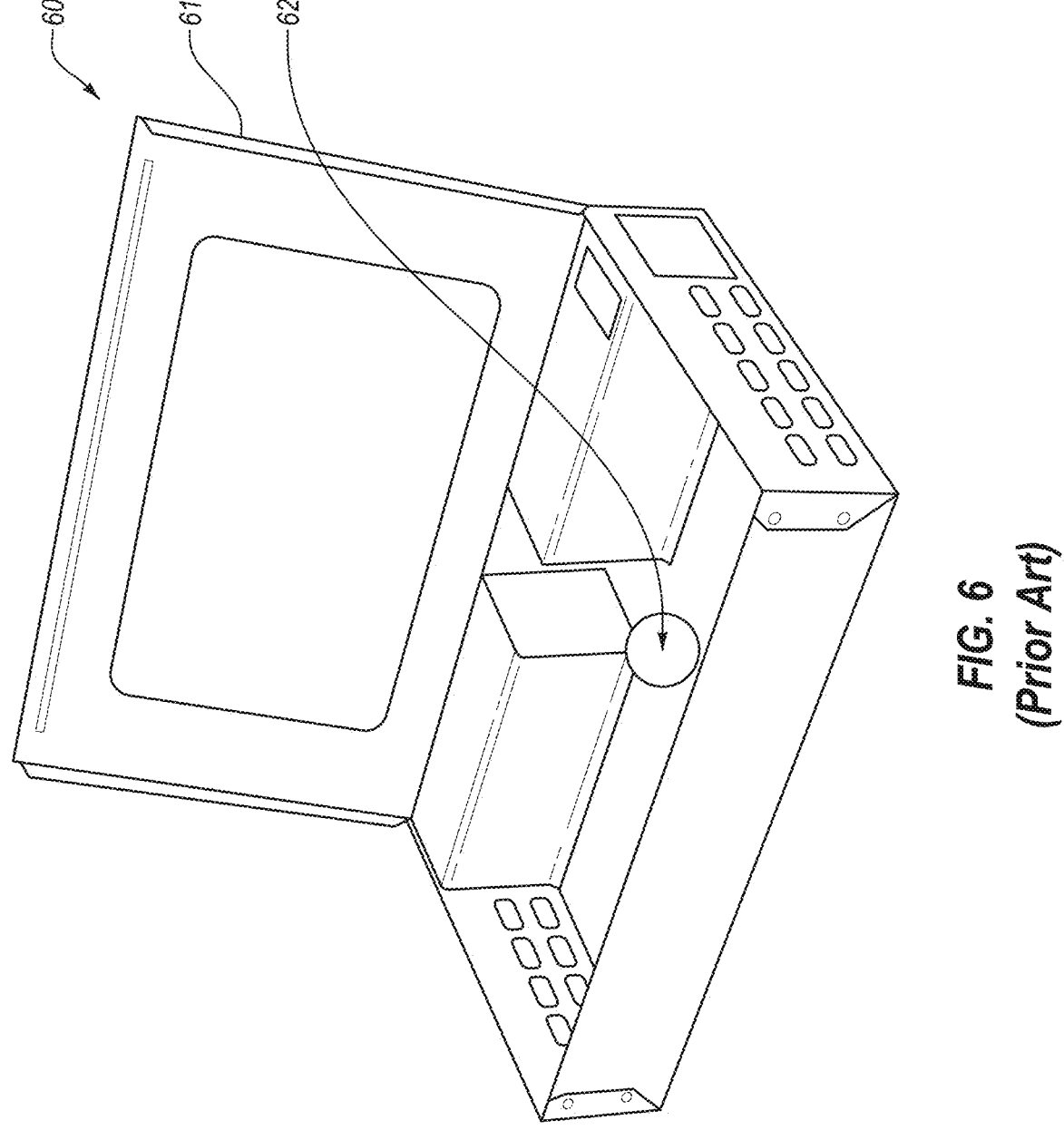

FIG. 6 shows an example of a conventional indoor/outdoor multi-rodent trap 60. FIG. 6 shows trap 60 with lid 61 opened. To use trap 60, a user must manually place bait and/or an attractant within trap 60 (e.g., at bait/attractant placement location 62). After bait placement, the bait loses effectiveness due to exposure to air, fails to adapt to changes in pest consumption and/or feeding patterns (for example, based on seasonal changes), and fails to address other pest instinctual aspects regarding bait optimization over time. Accordingly, the user must continually check and install new bait.

As will be described below, embodiments of the present disclosure overcome the shortcomings in these conventional devices. Specifically, embodiments of the present disclosure (described herein) may be used to retrofit and/or replace the conventional devices to gain the benefits of embodiments described herein. Specifically, some of the primary operative aspects of the present disclosure include (1) one or more sealed microchambers as part of an overall structure, (2) one or more substances contained within the one or more microchambers, (3) a movable element, motor, or other to electro and/or mechanical method to unseal and expose to the atmosphere the sealed one or more microchambers, (4) an electromechanical energy source that may further include a battery or solar powered source, and (5) one or more sensors/inputs that provide input information including, but not limited to, one or more of, for example: (i) season(s) (ii) temperature trend(s) (iii) length of day(s), (iv) change(s) in length of day(s) over a period of time(s), (v) the deterioration of the potencies of substance(s) based on the exposed shelf-life and/or spoilage of the substance(s), (vi) indoor versus outdoor usage, (vii) geographical location, (viii) species/subspecies, (ix) or other input information to allow for the optimization of the selection of one or more substance(s). For example, the optimization of one or more substance(s) to attract and/or poison targeted insects/rodents/pests. Other operative aspects of the disclosure may include, for example (1) optional guard(s) to protect the substance(s) from undesired direct contact with pests and/or humans, (2) optional user interface(s), (3) optional wired and/or wireless communications interface(s), (4) optional microprocessor that further enacts one or more algorithms, (5) optional modularity to replace certain aspects of the embodiments of the present disclosure.

Aspects of embodiments of the present disclosure are further illustrated in the various exemplary Figures described below. It is noteworthy that embodiments of the present disclosure are not limited to a specific shape, form factor, or scale, such as those shown in FIGS. 7A-10C, but rather the embodiments of the present disclosure can be fashioned and/or scaled to fit within bait systems (or take the place of bait, poison, attractant), traps, or other pest control apparatuses, be fashioned to take the place of existing apparatuses, or be fashioned as a new stand-alone device.

Figure 7A:
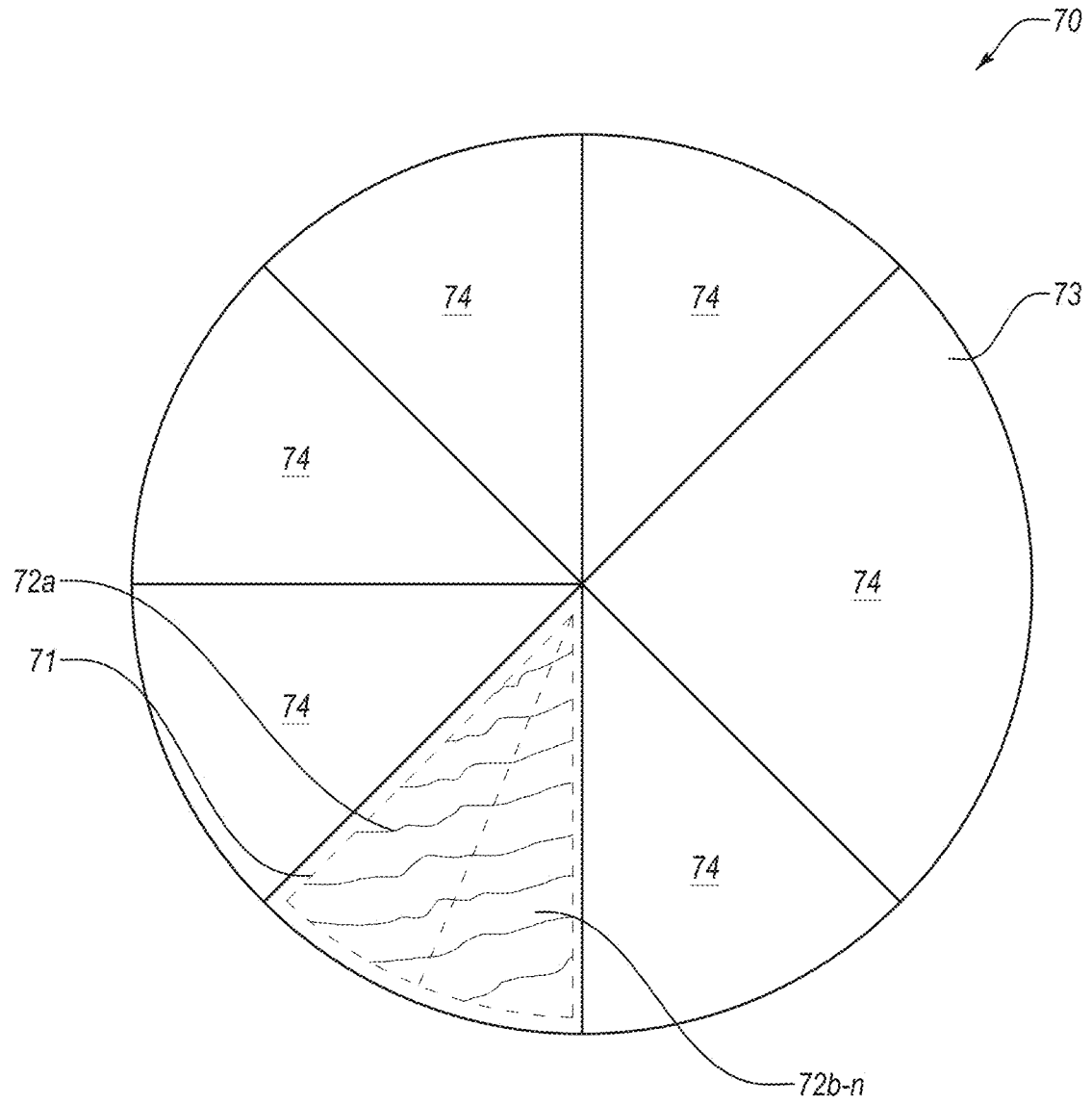
FIGS. 7A and 7B illustrate views of an exemplary pest control substance delivery system and components thereof.

FIG. 7A illustrates an exemplary basic top-view embodiment of embodiments of the present disclosure that include the sealed microchambers, optimally exposed microchamber(s), and aperture assembly 70 that comprises (1) one or more sealed/sealable microchamber(s) assembly 73 as part of an overall structure/housing, (2) one or more sealed substance(s) 74 contained within the one or more microchamber(s) of microchambers(s) assembly 73, (3) a movable element, such as aperture assembly 71, or other to electro and/or mechanical element to unseal and/or expose to the atmosphere the sealed/sealable one or more optimally exposed substance 72a (or optional additional optimally exposed substance(s) 72b-72n) in a time-ordered manner. In detail, FIG. 7A shows a top view of subdivided sealed microchambers as part of microchamber(s) assembly 73. It is noteworthy that while FIG. 7A (and FIG. 7B, below) illustrates the use of a pie-shaped aperture, embodiments of the present disclosure are not limited to the use of a specific type of aperture (opening) alone but rather may use any electro and/or mechanical opening such as, for example, a cutout, movable wall/structure, diaphragm, iris, reduction/elimination of a film, void in a sealing gel, or other means to create an opening and/or exposure to the atmosphere. Further, the opening is not limited to a specific horizontal or vertical position, but rather can be adapted to open, for example, on the side, or the bottom, or at an angle relative to a given axis and/or orientation. As shown in FIG. 7A, the aperture assembly 71 enables the exposure of an optimally exposed substance 72. The aperture 71 can be used to expose one or more sealed microchamber(s), for example, via rotation/movement of either the aperture or the microchambers, via a turret, or other means. For example, exposure of the optimally exposed substances 72a can occur by using an electric motor to turn the assembly that holds the microchambers relative to the aperture, or by using an electric motor to turn an assembly that comprises the aperture relative to the assembly that holds the microchambers, or by using a motor to open an aperture without any rotation at all. Moreover, the aperture assembly 71 can be used to expose one or more optional additional optimally exposed substance(s) as illustrated by 72b-72n. Further, more than one aperture can be used for exposing one or more sealed substance(s) 74. It is noteworthy that while the shown one or more substance(s) 74 use the same reference designation "74," each designation of "74" shown in FIG. 7A (and FIG. 7B described below) can be the same substance, and entirely different substances, multiple substances, or any combination.

Figure 7B:
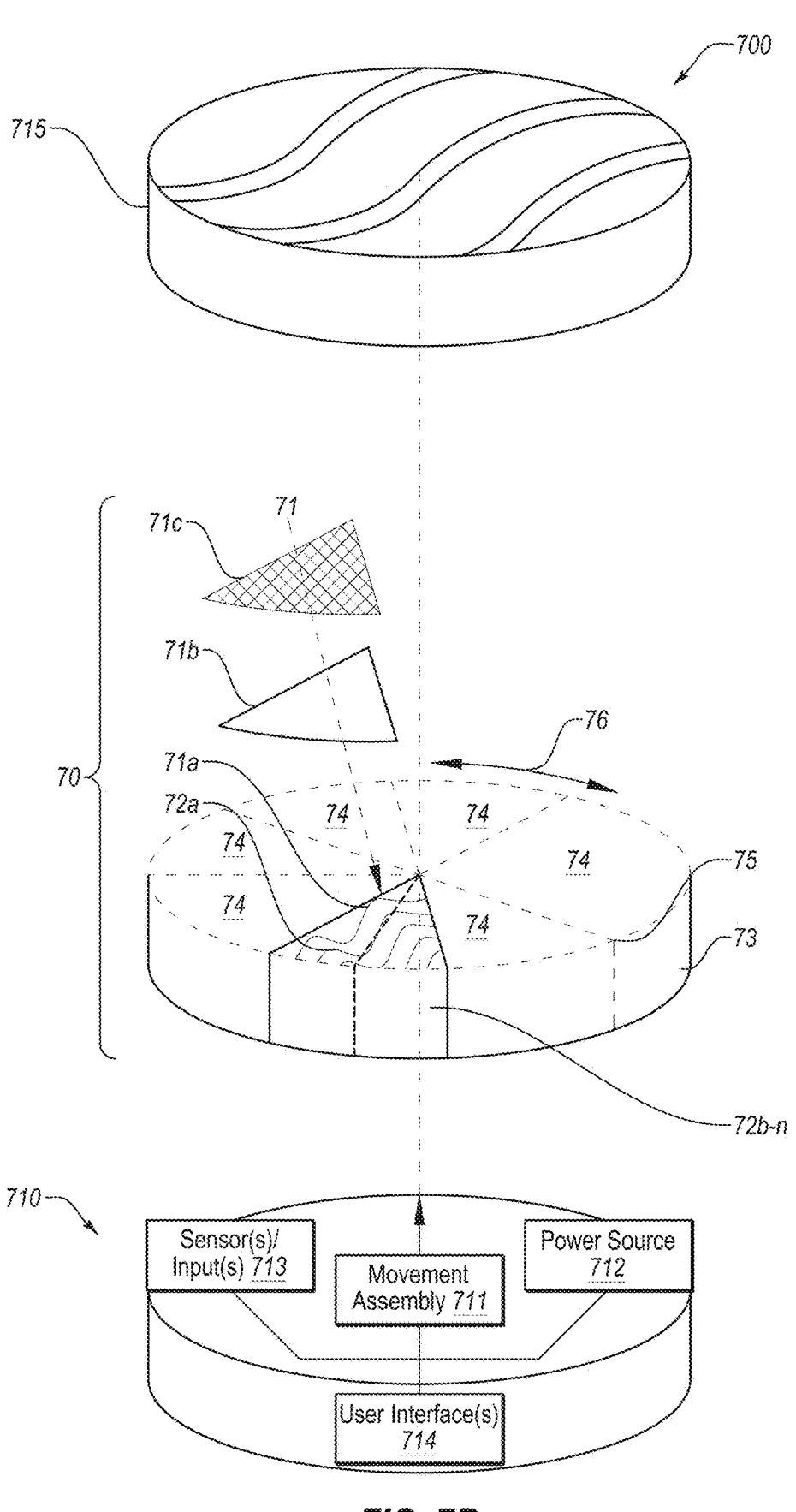

FIG. 7B is an exemplary embodiment illustration that shows an exploded side view assembly diagram of a pest control substance delivery system 700 that includes aspects described in FIG. 7A and further illustrates additional aspects of the pest control substance delivery system 700. Starting from the top of FIG. 7B, the pest control substance delivery system 700 includes an optional shroud 715 to prohibit contact with, or destruction from, pests or humans. The structure optional shroud 715 can, for example, cover the entire pest control substance delivery system 700, or just a portion of the pest control substance delivery system 700, such as the top and/or sides of the apparatus.

Moreover, turning to the center portion of the pest control substance delivery system 700, specifically, the sealed microchambers, optimally exposed microchamber(s), and aperture assembly 70, FIG. 7B provides additional details concerning FIG. 7A. As shown in FIG. 7B, aperture assembly 71 comprises an aperture opening 71a (via e.g., a cutout, movable wall/structure, diaphragm, iris, reduction/elimination of a film, void in a sealing gel, or other means to create an opening and/or exposure to the atmosphere), a seal 71b (e.g., an O-ring, ring, silicon, gel, gasket, edge of a film/membrane, plastic (that would cause sealing of the sealed microchamber(s)), and/or other sealing elements, etc.), and an optional guard 71c (e.g., using well-known materials such as mesh, screen, metal or plastic with slots or air vents, etc.). Alternatively, seal 71b may encompass (or be in addition to) optional seal(s) underneath the top plate with optional seal(s) 75 (using e.g., seal(s)/sealing elements discussed above). The optional seals(s) comprised within top plate with optional seal(s) 75 may for example, encompass portions of the apparatus, or the entire perimeter(s) of the sealed microchambers, optimally exposed microchamber(s), and aperture assembly 70. The optional seal(s) may also be alternatively incorporated into the sealed microchambers, optimally exposed microchamber(s), and aperture assembly 70. Additionally, the optional guard 71c, optional shroud 715, seal(s) (e.g., 71b), top plate with optional seal(s) 75, and/or other components in any combination may be comprised, molded, or built as a single assembly or component, such as for example, molded into a single piece of plastic or other material. As shown in FIG. 7B, the volume and/or size of the microchambers for the sealed substance(s) 74 (or the optimally selected substance 72*a*, and/or 72*b*-72*n*) may be different volumes and/or different sizes and/or different substances.

Other aspects of sealed microchambers, optimally exposed microchamber(s), and aperture assembly 70 may be similar to those already described above concerning FIG. 7A. In FIG. 7B, an arced arrow indicates the optional rotation 76 of the aperture with respect to the substance(s) 74 to expose optimally exposed substance 72*a* (and optional additional optimally exposed substance(s) 72*b*-72*n*). Such rotation may include the rotation of the top plate with optional seal(s) 75 (or portion thereof), and/or rotation of the sealed microchambers, optimally exposed microchamber(s), and aperture assembly 70, and/or the rotation of the aperture assembly 71, or other movement, or any combination. The optional rotation 76 is neither confined to a specific direction nor confined to require optional rotation 76 in both directions. Further, the pest control substance delivery system 700 is not limited to the rotation of one or more assemblies with respect to the aperture assembly 71, but as already noted, the aperture assembly 71 can expose the optimally exposed substance 72*a* (and optional additional optimally exposed substance(s) 72*b*-72*n*) via, for example, a cutout, movable wall/structure, diaphragm, iris, reduction/elimination of a film, void in a sealing gel, or other means to create an opening and/or exposure to the atmosphere. Further, more than one aperture may be used for exposing one or more sealed substance(s) 74.

Also referring to FIG. 7B for example, one or more of the microchamber(s) contents within microchamber(s) assembly 73 may be blank/no substance/empty (sealed or unseal) for the sake of shipping or other reasons (such as when pests are dormant, or the device is not in use).

Turning to the exemplary base assembly 710 as shown in FIG. 7B, aspects of the pest control substance delivery system 700 further include a movement assembly 711, power source 712, sensor(s)/input(s) 713, and an optional user interface(s) 714. Movement assembly 711 is used to expose the optimally exposed substance 72*a* (and optional additional optimally exposed substance(s) 72*b*-*n*) via aperture assembly 71. Movement assembly 711 may be electro and/or mechanical, such as for example, a motor (such as a DC (Direct Current), AC (Alternating Current), synchronous, asynchronous, stepper motor, and/or motor assembly, and/or other electromechanical members (e.g., selectable aperture(s), mechanism to remove/melt film, etc.). For example, movement assembly 711 may be used to enact the optional rotation 76 of all or a portion of the above-described sealed microchambers, optimally exposed microchamber(s), and aperture assembly 70. For example, movement assembly 711 may employ a shaft or other electromechanical drive mechanisms (gears, etc.) or other means to expose sealed substance(s) 74 to the atmosphere. Additional optional aspects of movement assembly 711 may include positional sensing of any rotating elements (e.g., using position encoders, position synchronous controller sensing, contact switch(es), optical sensors, stops, other known in the art sensor(s), etc.).

Other exemplary aspects of base assembly 710 (as shown in FIG. 7B) may include one or more sensor(s)/input(s) 713 that are used to provide input information. In turn, the input information may be used in conjunction with (and/or used to control) movement assembly 711 to automatically select the optimally exposed substance 72*a* (and optional additional optimally exposed substance(s) 72*b*-*n*). For example, one or more sensor(s)/input(s) 713 may sense (and/or measure) input information related to one or more of: a light sensor, timer and/or time sensor, temperature sensor, a location sensor, or other sensor(s) to detect and/or determine information used to optimally select a substance for the targeted pest(s). The input information may in turn then be used to enable or disable the movement assembly 711. Sensor(s)/input(s) 713 may further be sensors that include circuitry as an overall sensor that averages or detects conditions over a period of time, or in real-time. For example, one or more sensors 713 may provide a signal and/or data input for temperature as an average, minimum temperature, maximum temperature, length of daylight, etc. Thus, sensor(s)/input(s) 713 may include input information comprising, but is not limited to, for example, one or more of the season(s), temperature trend(s) over a period of time(s), length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information to automatically adapt to one or more instinctual insect(s)/rodent(s)/pest(s) changes over a period of time. The input information may also include, or may be combined with, manually input or automatically input information, information such as predefined or derived input parameters including those obtained from an optional memory, obtained from one or more sensor(s)/input(s) 713, other wired inputs, or wireless inputs as already discussed above with respect to "input information." For outdoor use, base assembly 710 can be sealed using well-known methods such as watertight seals and/or coatings.

Additionally, feedback to the user is optionally provided using user interface(s) 714. User interface(s) 714 is used, for example, to provide user feedback. The user interface(s) 714 may comprise one or more interfaces and/or indicators, such as one or more LEDs (Light Emitting Diodes), a display, other known interface(s), or a combination thereof. For example, user feedback via user interface(s) 714 may comprise the blinking of pattern(s) on an LED, different colors of LEDs, or other user interface means to provide the user with feedback regarding reading(s), and/or status(es), and/or information. As such, user interface(s) 714 may communicate/convey any one of the following conditions, but not limited to, by way of example: state(s), value(s), reading(s), condition(s), error(s), low battery/low energy, maintenance needed, replacement of microchamber(s) with sealed substance(s)/assembly needed, replace the structure that includes one or more microchambers, and/or replace any other serviceable part(s). The user interface(s) 714 can also be used to communicate certain settings, for example, as feedback to a user to convey settings and/or configurations. Such user settings may include, for example, the selection of a desired species/subspecies, time, climate zone, or other information. The user interface(s) 714 can also be used to provide readings, such as readings read or information derived from input information or calculated from input information. For example, a determined parameter such as season.

Also shown in FIG. 7B, power source 712 is used to power the overall apparatus including base assembly 710 the further comprises movement assembly 711 and optionally, the one or more sensor(s)/inputs 713 (if present) and user interface(s) 714 (if present). Power source 712 may be any type of energy source, such as a battery including a rechargeable battery, or other electrical energy storage device (e.g., capacitor, super capacitor, etc.), mechanical energy storage, chemical storage, solar cell (that can further charge the battery), energy harvesting source (e.g., by the movement of a mechanical or electromechanical assembly), or any combination. A solar cell energy source may further be used for the detection of light levels, using for example an output voltage signal, thus aspects of power source 712 may be combined to also serve as a sensor with respect to sensors/ input(s) 713.

The exemplary pest control substance delivery system 700 as shown in FIGS. 7A and 7B (and further those embodiments shown in FIG. 8 through FIG. 10C) can be used in place of traditional substances to attract and/or poison pests. For example, within the conventional trap shown in FIG. 6, it would be advantageous to use an embodiment of the present disclosure that includes the optional shroud 715, which would prevent actual pest consumption of the bait, yet continue to attract small rodents such as mice as the various sealed substance(s) 74 are exposed.

Alternatively, embodiments of the present disclosure may be fashioned and/or scaled to fit within bait systems (or take the place of bait, poison, attractant), traps, or other pest control apparatuses, be fashioned to take the place of existing (e.g., attractant) apparatuses, or be fashioned as a new stand-alone device. Additionally, one skilled in the art would appreciate that placement of embodiments of the present disclosure within conventional baits systems is not limited to a single position or orientation. For example, the embodiments of the present disclosure may be fashioned to be located within bait systems (e.g., the top, bottom, a side, mounted to a lid (or cover, wall, housing, structure, etc.)) in a variety of orientations (e.g., upright, sideways, upside-down while mounted to a lid or other structure, etc.) based on the target pest(s).

Figure 8:
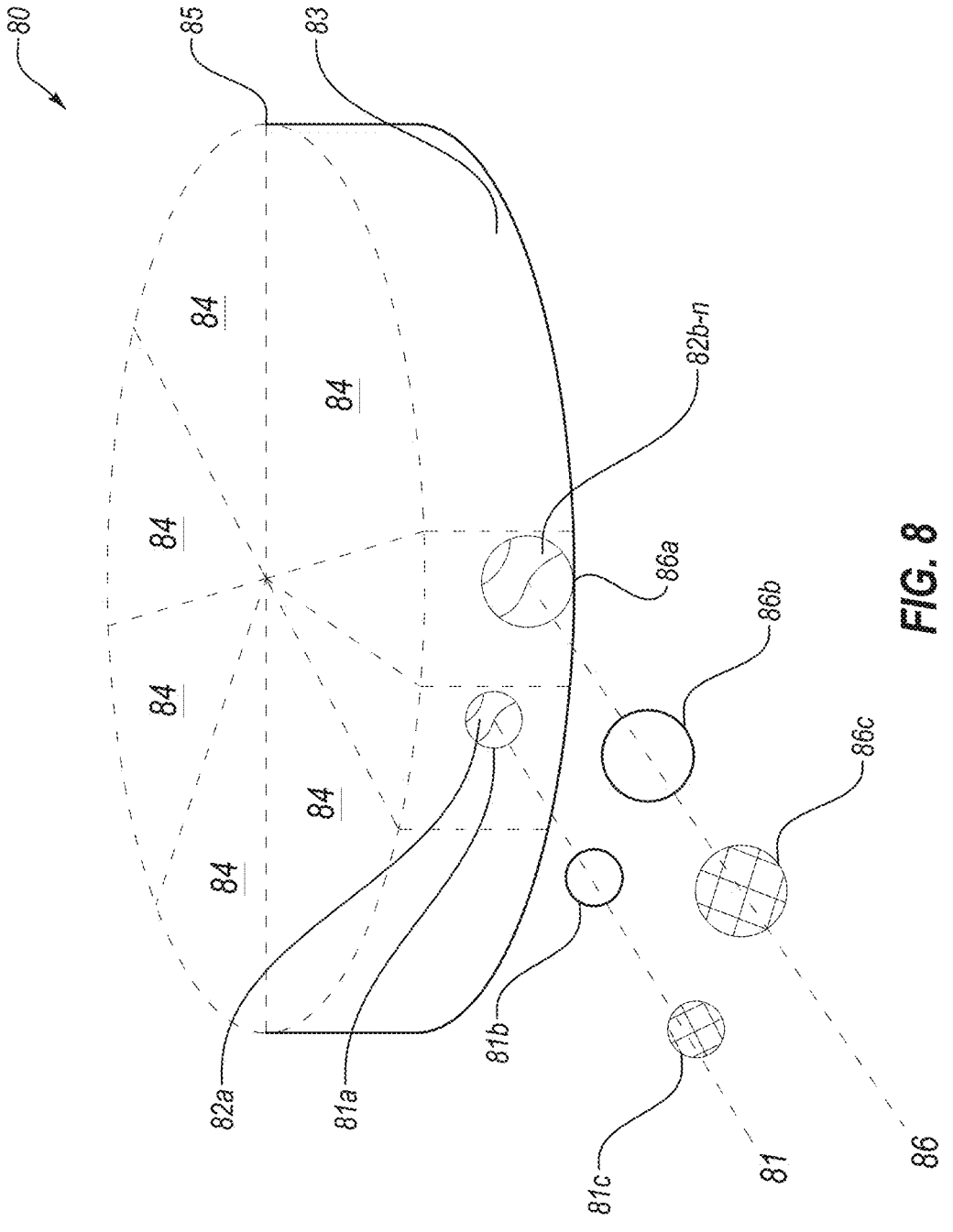
FIG. 8 illustrates a perspective view of another component of an exemplary pest control substance delivery system.

While the exemplary pest control substance delivery system 700 shown in FIG. 7A and FIG. 7B can, for example, be used generically for rodents, insects, or other pests, FIG. 8 shows a modified embodiment concerning attributes of the aperture itself (to accommodate specific types of pests.) Otherwise, FIG. 8 shares common elements as already shown and described above concerning FIG. 7A and FIG. 7B which are incorporated herein. The modified embodiment shown in FIG. 8 would be effective against, for example, insects such as ants and/or roaches, to replace ant bait (poison) stations such as those with side entryways (e.g., such as the devices shown in FIG. 4 and FIG. 5). Specifically, FIG. 8 illustrates an exemplary basic form embodiment as previously described in FIG. 7A and FIG. 7B, however, FIG. 8 further shows that the sealed microchambers, optimally exposed microchamber(s), and aperture assembly 80 can accommodate a number of different pests based on different types/locations/shapes of one or more apertures. For example, sealed substance(s) 84 can be exposed via turret aperture assembly 81 (and optional additional turret aperture assembly 86) to expose optimally exposed substance 82a (and optional additionally optimally exposed substance(s) 82b-82n) via side turret aperture opening 81a (and optional turret aperture opening(s) 86a). It is noteworthy that while the shown one or more substance(s) 84 in use the same reference designation "84," each designation of "84" shown in FIG. 8 can be the same substance, and entirely different substances, multiple substances, or any combination.

One skilled in the art would appreciate the one or more apertures shown and described concerning FIG. 7A, FIG. 7B, and FIG. 8 can be in any location (e.g., top, bottom, side)

and can comprise various shapes to accommodate a variety of one or more different targeted pests (e.g., ants, ants and roaches, regular house ants and carpenter ants, regular house ants and fire ants, etc.). Side turret aperture opening 81a (and optional additional turret aperture opening 86a) can further be sealed via one or more seals, such as an optional seal 81b (and optional additional seal(s) 86b). While the use of an optional guard such as, for example, 81c (and/or optional additional guard(s) 86c) would not be used for insects wherein the desired outcome is for the insects to ingest and/or take the poison, in other circumstances, optional guard 81c (and optional additional guard(s) 86c) could alternatively be used if the desired outcome is to optimally attract pests to a trap while protecting against the consumption of the exposed optimally exposed substance 82a (and/or optional additional optimally exposed substance(s) 82b-82n).

As discussed above with respect to FIG. 7A and FIG. 7B, the aperture(s) in FIG. 8 can be implemented using a wide variety of aperture implementations. Also shown in FIG. 8 is a top plate with optional seal(s) 85 which may use sealing methods such as those discussed above concerning FIG. 7B, wherein such seal(s) can further be combined with optional seal 81b (or optional additional seal(s) 86b). The optional guard(s) (e.g., 81c and 86c), seal(s) (e.g., 81b and 86b), top plate with optional seal(s) 85, and other components may be comprised, molded, or built as a single assembly or component in any combination, such as for example, molded into a single piece of plastic or other material. While FIG. 8 shows an additional optional additional turret aperture assembly 86, any additional such optional turret aperture assemblies can be added to further expose the optional additional optimally exposed substance(s) 82b-82n.

Overall, aspects of FIG. 8 may be further combined with, for example, those aspects described above with respect to FIG. 7A and FIG. 7B, such as base assembly 710 and/or optional shroud 715.

Figure 9:
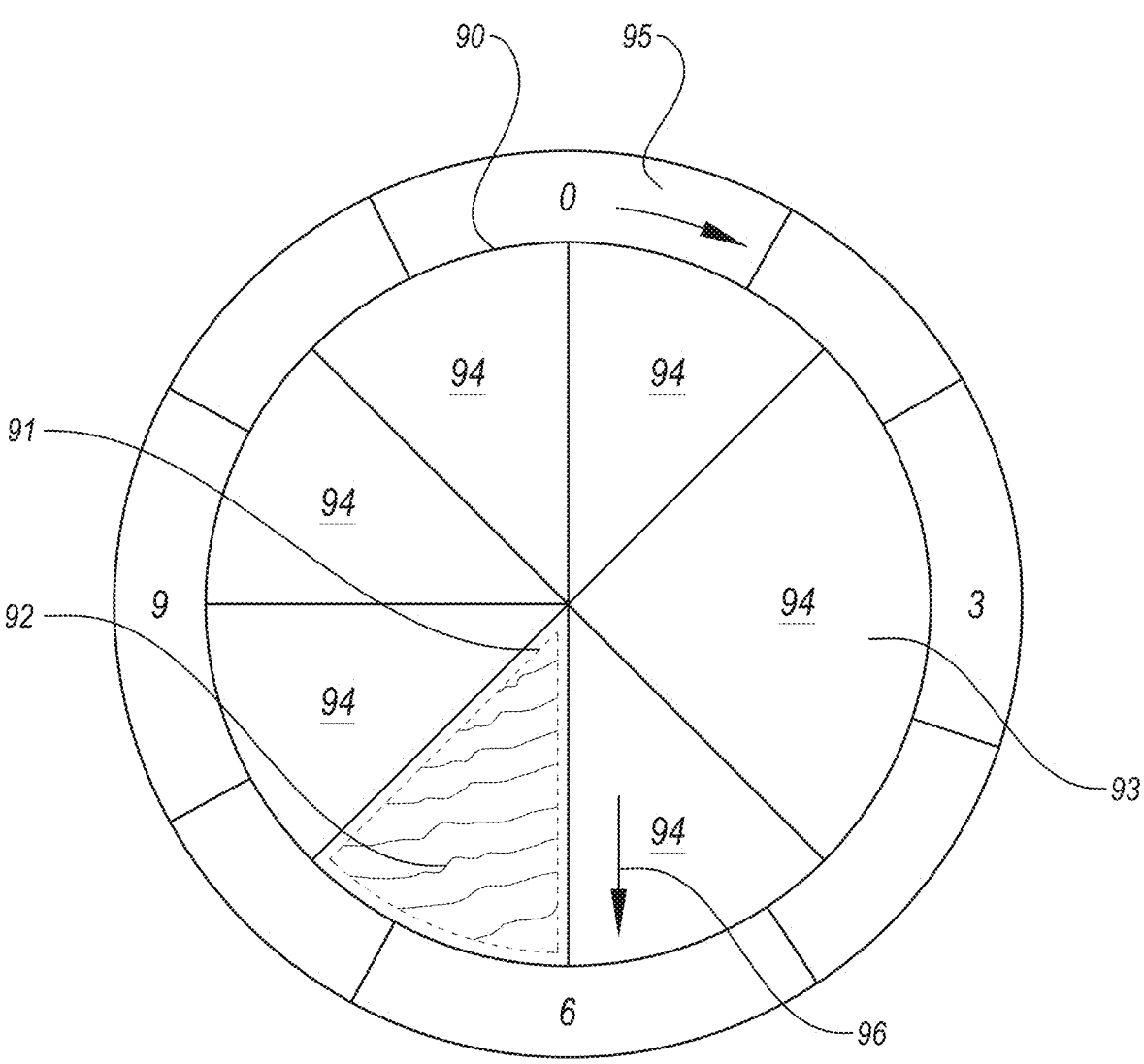
FIG. 9 illustrates a top view of another component of an exemplary pest control substance delivery system.

FIG. 9 further illustrates additional exemplary aspects of an embodiment that may comprise one or more settable input(s) from the user. The exemplary embodiment shown in FIG. 9 may be combined with the embodiments shown and described in FIG. 7A, FIG. 7B, and FIG. 8 (incorporated herein) to form additional exemplary embodiments. As shown in FIG. 9, an initial input may be set, for example, via a user using input setting assembly 95. Input setting assembly 95, for example, may include a rotating settable dial that further uses, for example, an input pointer/index 96 or other indicator and/or user interface. Such an input setting can be input by the user to initialize the apparatus, for example, a timer setting, and/or alternatively a month setting, and/or a season setting, and/or a zone setting (e.g., based on climate, the prevalence of a species concerning a certain geographical zone, time zone, etc.), targeted species or sub-species, or to set other input information. Alternative to rotating setting assembly 95, the apparatus comprising the microchambers may be rotated instead.

While a dial is shown in FIG. 9, alternative input information from a user may include, for example, one or more of (1) the positioning of the sealed microchambers, optimally exposed microchamber(s), aperture assembly 90, and/ or (2) positioning and/or state of microchambers(s) assembly 93, (3) positioning and/or state of aperture assembly 91, (4) other physical component(s) states, values, conditions, and/or configurations, (5) a manual adjustment, (6) a position of a pull tab, (7) a configuration including sensing the position/attributes related to the installation of one or more substances, including e.g., sealed substance(s) 94, (8) the position of a switch, (9) input information as a result of other manual action(s), (10) predefined or derived input parameters including those obtained from an optional memory. Moreover, settable input(s) may be obtained locally, remotely, manually, or automatically and may comprise input information via a sensor, wired input information via a wired input, or wireless input information via a wireless connection. For example, the input settings can comprise one or more input information settings including those input via a user manually, states, or via inputs obtained from one or more sensor(s)/input(s), information such as predefined or derived input parameters including those obtained from an optional memory, wired inputs, or wireless inputs. For example, the user may input settable information, for example, using an extended user interface(s) via mobile devices and computerized devices using a software application. Upon the apparatus obtaining one or more input settings under the exemplary embodiment, the system then automatically operates to expose an optimally selected substance 92 based on the targeted pest(s). Overall, the aspects of FIG. 9 may be further combined with, for example, those aspects described above with respect to FIG. 7A, FIG. 7B, and/or FIG. 8, such as base assembly 710, optional shroud 715, the exposure of one or more optimally selected substances (e.g., 72a-72n, 82a-82n, etc.) different aperture assemblies (e.g., 71, 81, 86, 91, etc.), and other elements as shown in by example in FIG. 7A, FIG. 7B, and FIG. 8. It is noteworthy that while the shown one or more substance(s) 94 use the same reference designation "94," each designation of "94" shown in FIG. 9 can be the same substance, and entirely different substances, multiple substances, or any combination.

Figure 10A:
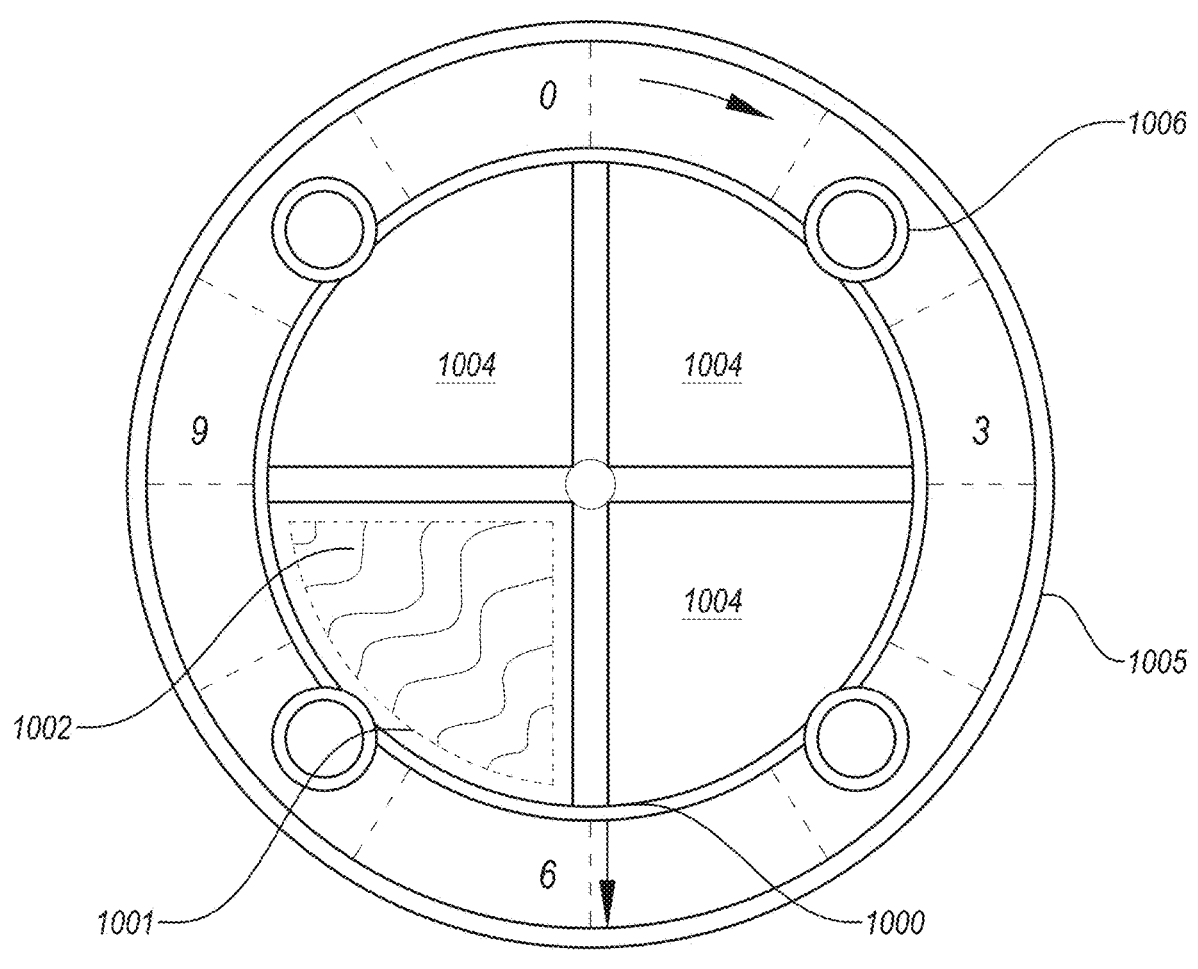
FIGS. 10A-10C illustrate views of an additional exemplary pest control substance delivery system and components thereof.
Figure 10B:
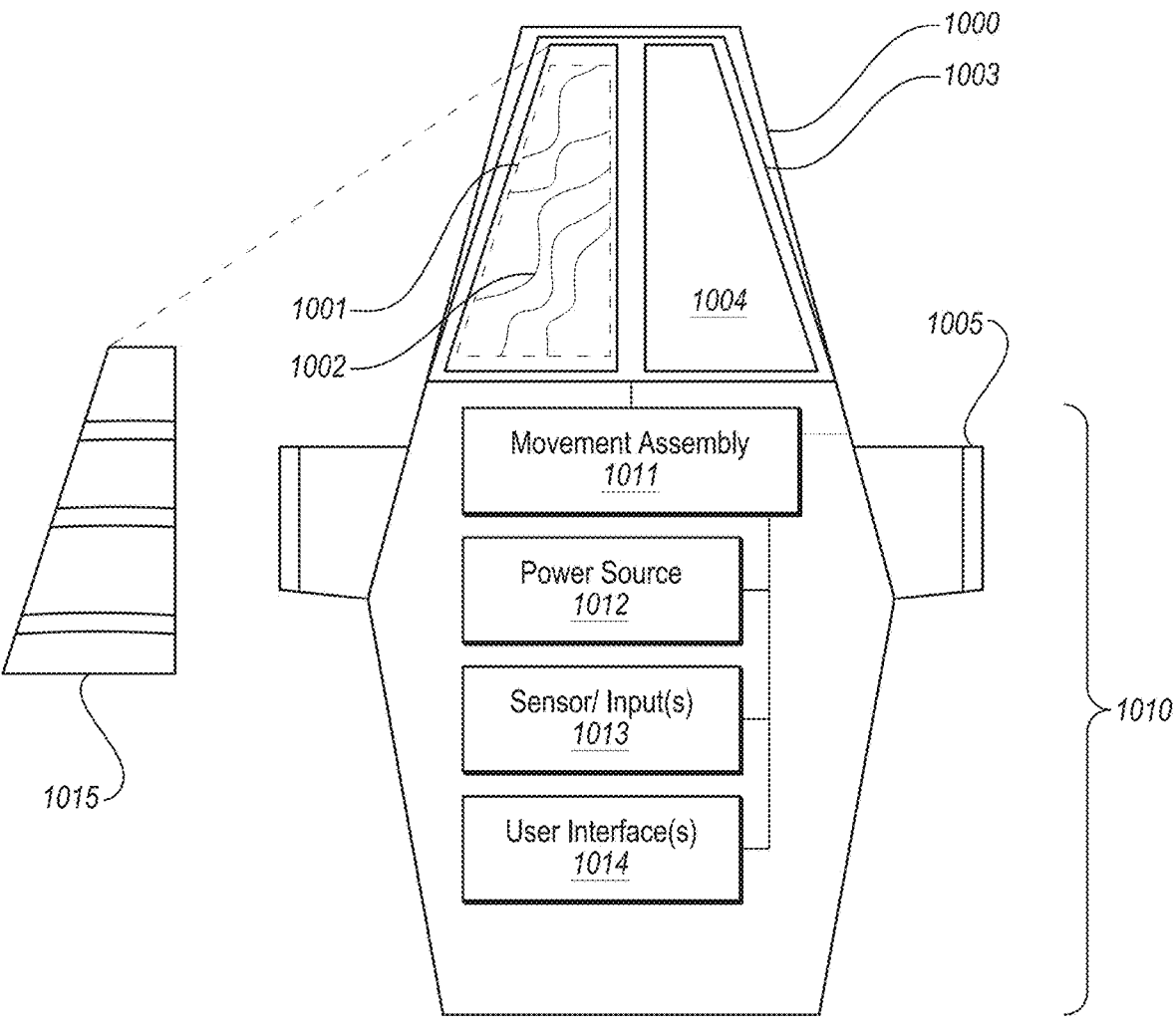
Figure 10C:
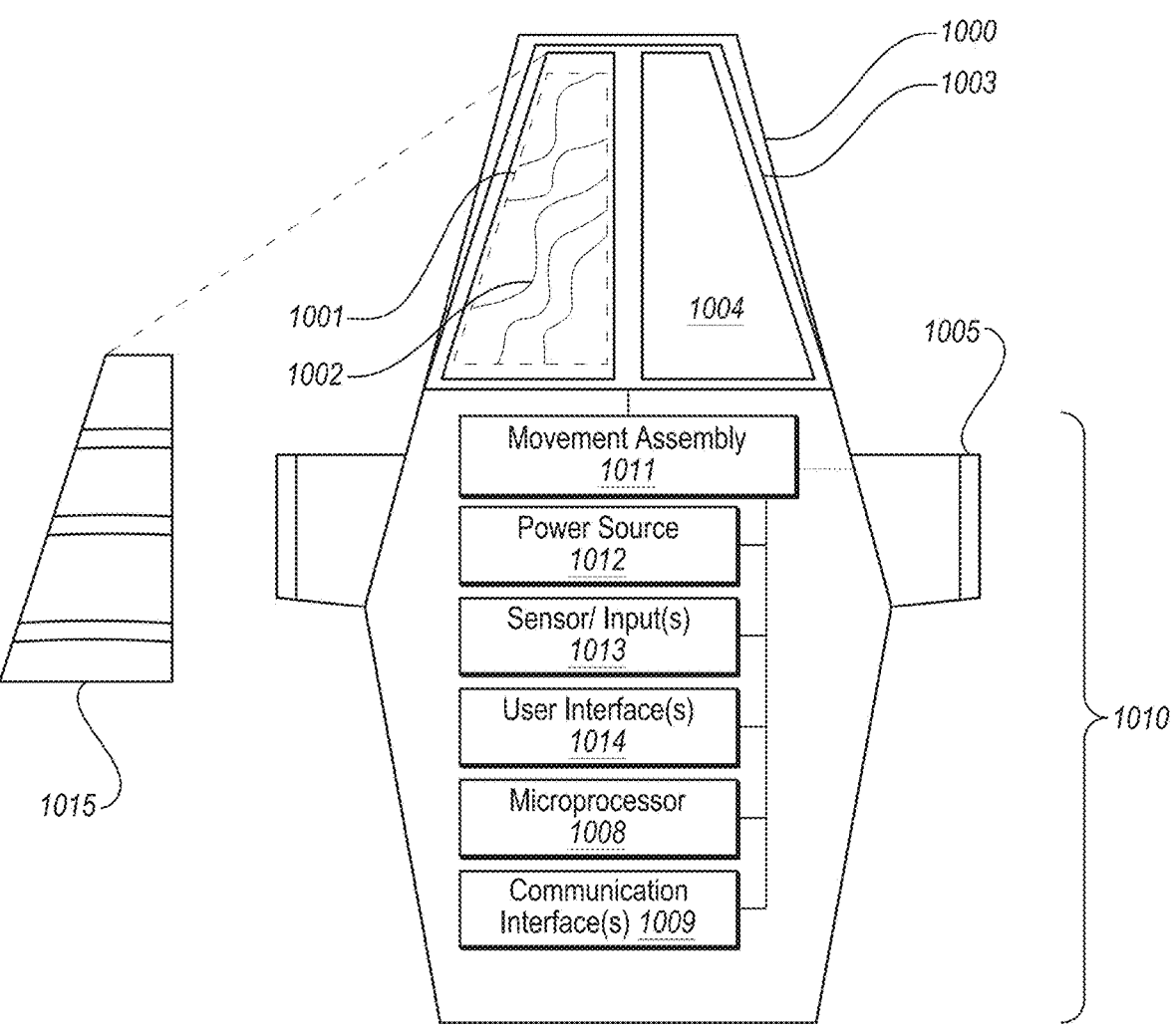

FIGS. 10A-C are additional exemplary embodiments that may incorporate aspects of the present disclosure already shown and described above concerning FIG. 7A through FIG. 9 (incorporated herein), whereas some or all of the initial input settings may be manually selected (as previously discussed above) or some or all of the settings may be automatically set or input via the use of one or more sensor(s)/input(s), predefined or derived input parameters including those obtained from an optional memory, wired inputs, wireless inputs, or other input information (as previously discussed above). Moreover, the exemplary embodiments shown in FIGS. 10A-10C may be form-fitted to replace, for example, the devices previously shown in FIG. 1 and FIG. 2. For example, the embodiment shown in FIGS. 10A-10C may be used within and thus retrofit the trap shown in FIG. 3 (e.g., inside the inverted cone 33, or another place within outer housing 34 such as at the top.) Further, embodiments of the present disclosure can be form-fitted to accommodate certain kinds of pests. For example, the embodiments of the present disclosure can be modified with passageway(s), such as passageway(s) 1006 to allow yellowjackets to pass through to enter a retrofitted trap.

With respect to FIG. 7A through FIG. 9, the exemplary embodiments that are shown in FIGS. 10A-10C incorporate alternative corresponding elements including sealed microchambers, optimally exposed microchamber(s), and aperture assembly 1000, an aperture assembly 1001, sealed substance(s) 1004, and an optimally exposed substance(s) 1002 (e.g., optimally exposed substance and optional additional optimally expose substance(s)), a microchamber(s) assembly 1003, optional shroud 1015, and other elements as shown in FIG. 7A through FIG. 9. Thus, the exemplary embodiment(s) shown in FIGS. 10A-10C may incorporate an alternative corresponding input setting assembly 1005 which may comprise, for example, the input information previously discussed above concerning FIG. 9. Additionally, FIGS. 10B-10C (which illustrate side views of alternative embodiments) further illustrates, as previously described, a corresponding movement assembly 1011, a power source 1012, optional sensor(s)/input(s) 1013, and an optional user interface(s) 1014. It is noteworthy that while the shown one or more substance(s) 1004 use the same reference designation "1004," each designation of "1004" shown in FIGS. 10A through 10C can be the same substance, and entirely different substances, multiple substances, or any combination.

Further, FIGS. 10A-10C also share a comparable, optionally detachable base assembly 1010 as previously described concerning FIG. 7B. The exemplary embodiment shown in FIG. 10C further comprises microprocessor 1008, and communication interface(s) 1009. Microprocessor 1008 may be configured to execute the machine-readable instructions and reads data (e.g., input information, data, predefined parameters, constants, etc.) which may further be stored in memory. The memory may comprise one or more memories including one or more memories incorporated into microprocessor 1008.

Microprocessor 1008 may also obtain input information, such as that obtained from the input setting assembly 1005, and/or sensors(s)/input(s) 1013, and/or via input information obtained from predefined or derived input parameters including those obtained from memory comprised with microprocessor 1008, and/or via wired or wireless communication interface(s) 1009. The communication interface(s) 1009 can be any wired or wireless communication interface, such as a hardwire connection (e.g., an analog or digital signal, USB, LANs, PANs, WANs, optical/IR, Zigbee, Z-Wave, GPS, satellite, radio waves, direct connection, etc.) and can further include local, remote, direct or wireless connections to one or more sensor(s)/input(s) as previously discussed.

The communication interface(s) 1009 may further be used as an extension of the user interface(s) to, for example, allow for user interface(s) via mobile devices and computerized devices using a software application. For example, but not limited to, such user interface(s) would provide the user with information related to one or more of: error, low battery/low energy, replacement of substance(s) needed, or other indication(s) (see also related previous discussion above related to the user interface(s).) Further, the low-cost wireless transmitter communication interface(s) may provide the user with user interface(s) to automatically order supplies, resolve an error, indicate low battery/low energy, the need to replace substance(s), the need to replace the structure that includes one or more sealed microchambers, or the need to replace any other serviceable part (see also related previous discussion above related to the user interface(s).) Moreover, the wired or wireless transmitter (or transceiver) may communicate any other user information as discussed above with respect to one or more indicator(s) and/or user interface(s). Also, such user interface(s) would allow the user to track sensor(s)/input(s) 1013 state(s), value(s), reading(s), condition(s), other input information, including trends, and/or calculations, and/or statistics related to input information.

Microprocessor 1008 may also be used to control movement assembly 1011 wherein movement assembly 1011 may further comprise a motor, and/or other electromechanical member(s) used in conjunction with aperture assembly 1001 to expose the optimally exposed substance(s) 1002. Aspects of FIGS. 10A-10C may be combined with similar components shown in FIG. 7A through FIG. 9 and described above (incorporated herein). For example, the implementation of the microprocessor 1008 and/or communications interface(s) 1009 of FIG. 10C may be implemented into the base assembly 710 depicted in FIG. 7B as a further exemplary embodiment.

The machine-readable instructions, executed by microprocessor 1008, may include for example, an algorithm such as the algorithm to enable and/or disable movement assembly 1011 as to when to select, and thus open, aperture assembly 1001 containing an optimally exposed substance(s) 1002. Such exemplary algorithms are further illustrated and described below with respect to the flowchart(s) illustrated in FIG. 11A, FIG. 11B and FIG. 12.

Figure 11A:
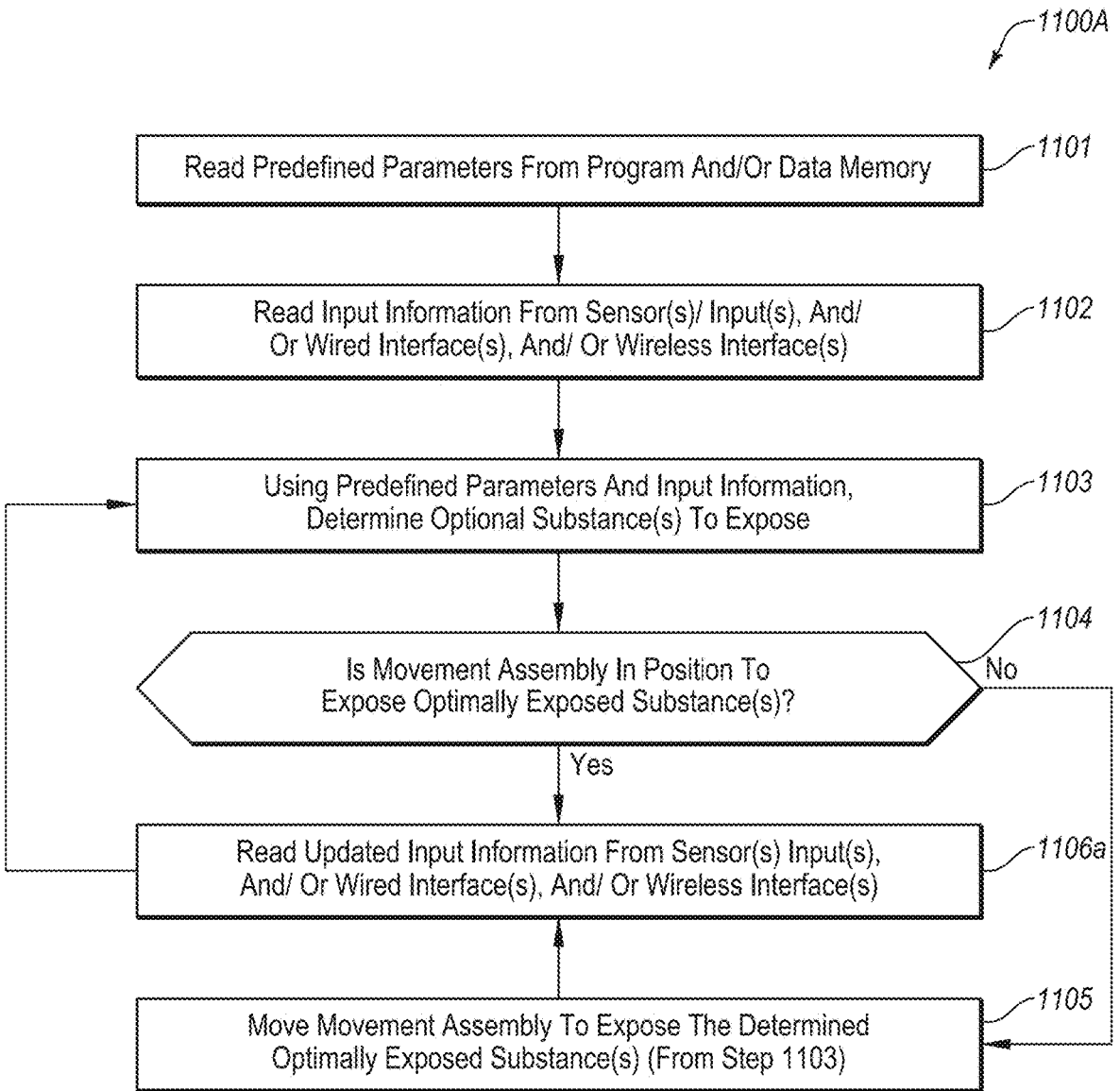
FIGS. 11A, 11B, and 12 illustrate exemplary flowcharts that can be executed as part of a pest control substance delivery system.
Figure 12:
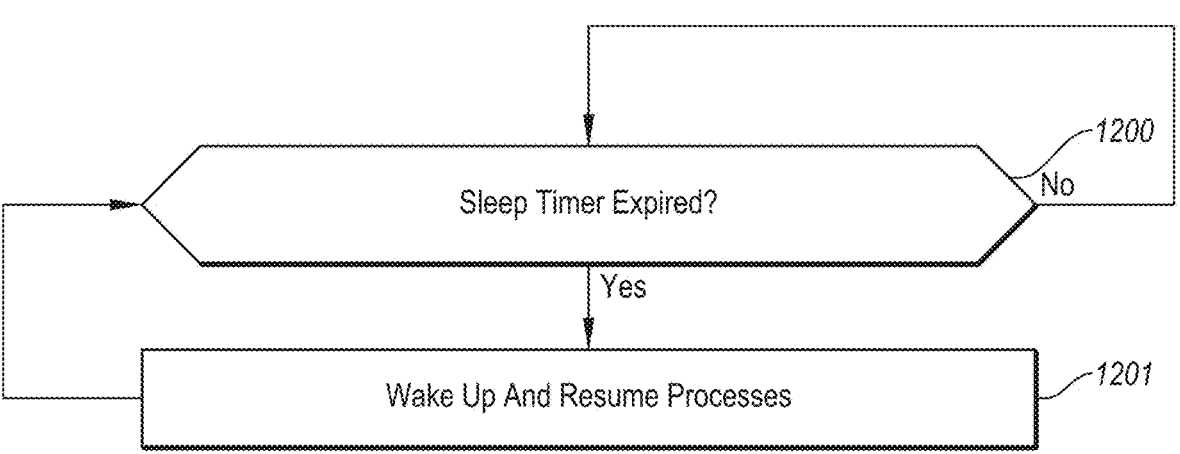
Figure 13:
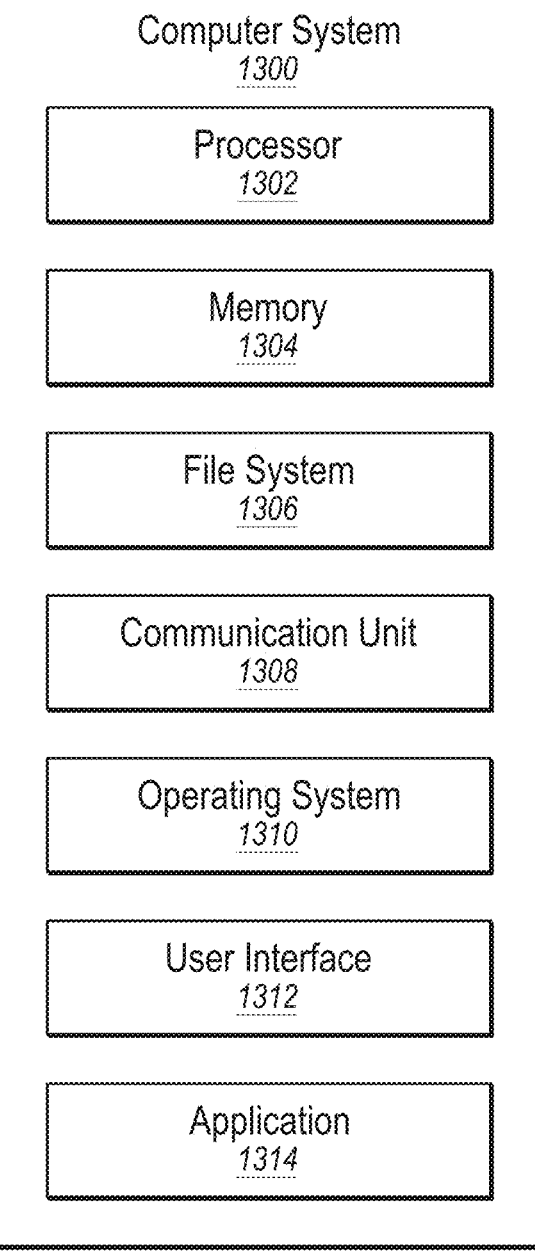
FIG. 13 illustrates an example computer system that may be employed in a pest control substance delivery system according to some embodiments of the present disclosure.

FIG. 11A illustrates an exemplary flowchart 1100A that can be executed by the microprocessor 1008 as previously shown and described above concerning FIG. 10C (and/or processor 1302 below concerning FIG. 13), however, FIG. 11A and the other exemplary flowcharts (e.g., FIG. 11B, and FIG. 12) herein are not limited to the exemplary embodiment of FIG. 10C and/or FIG. 13 alone. The flowchart 1100A in FIG. 11A starts at step 1101 at which point the predefined parameters stored in program and/or data memory are read. Also, input information including from sensor(s)/input(s), and/or wired interface(s), and/or wireless interface(s) are read at step 1102. This input information may be received from a variety of sources as previously described above. Using this collective data, an initial determination is made regarding what optimal substance(s) to select as shown in step 1103. For example, based on initial conditions including an initial season setting, one or more optimal substance(s) may be selected, for example, for the springtime. At step 1104, the initial position of the movement assembly with respect to the optimally exposed substance is evaluated. If during step 1104 it is determined that the optimally exposed substance is already exposed ("Yes" branch), then program flow proceeds to read updated input information from the sensor(s)/input(s), and/or wired interface(s), and/or wireless interface(s) at step 1106a. If on the other hand, at step 1104 it is determined that one or more optimally exposed substance(s) is not already exposed ("No" branch), then the program flow proceeds to step 1105 wherein the movement assembly is used to expose the optimally exposed substance(s) (as previously determined in step 1103). Program flow then reads updated input information from the sensor(s)/input(s), and/or wired interface(s), and/or wireless interface(s) at step 1106a. Such updates to input information, for example, as shown in step 1106A can proceed over a period of time, or can be further driven by one or more microprocessor-based interrupts and other techniques well known to those skilled in the art. Thus, the shown program flow is exemplary, where other alternatives exist.

As shown in FIG. 11A, program flow recursively flows to step 1103, wherein an evaluation is made as to if the one or more optimally exposed substance(s) are exposed based on the updated input information from step 1106a. It is noteworthy that embodiments of the present disclosure use input information and predetermined parameters to make intelligent decisions with respect to selecting the optimal substance(s) automatically. The input information may include, but is not limited to, for example, one or more of the season(s), temperature trend(s) over a period of time, length of day(s), change(s) in the length of day(s) over a period of time(s), the deterioration of the potencies of substance(s) based on the exposed shelf-life and/or spoilage of the substance(s), indoor versus outdoor usage, geographical location, species/subspecies, or other input information to automatically adapt to one or more instinctual insect(s)/ rodent(s)/pest(s) changes over a period of time. The predetermined parameters may include parameters that are used to correspond to a specific optimal substance(s) with respect to the input information. Moreover, the using of predefined parameters and input information to determine optimal substance(s) to expose (for example, step 1103), may include advanced methods to learn and accordingly determine what the one or more optimal substance(s) are, over a period of time. One skilled in the art would appreciate that such learning methods using the predefined parameters and input information to select one or more optimal substance(s) may include AI (Artificial Intelligence) methods, including for example, machine learning, reinforcement learning, supervised learning, unsupervised learning, and/or semi-supervised learning, trend detection, or other adaptive methods. For example, over a period of time, the process (for example, as part of step 1103) can learn and update temperature trend(s) information or other information, or enact learning derived from the abovementioned input information. Accordingly, the predefined parameters can be updated and adaptive. In turn, the decision process for the selection of the optimally exposed substance(s) can be adaptive.

Figure 11B:
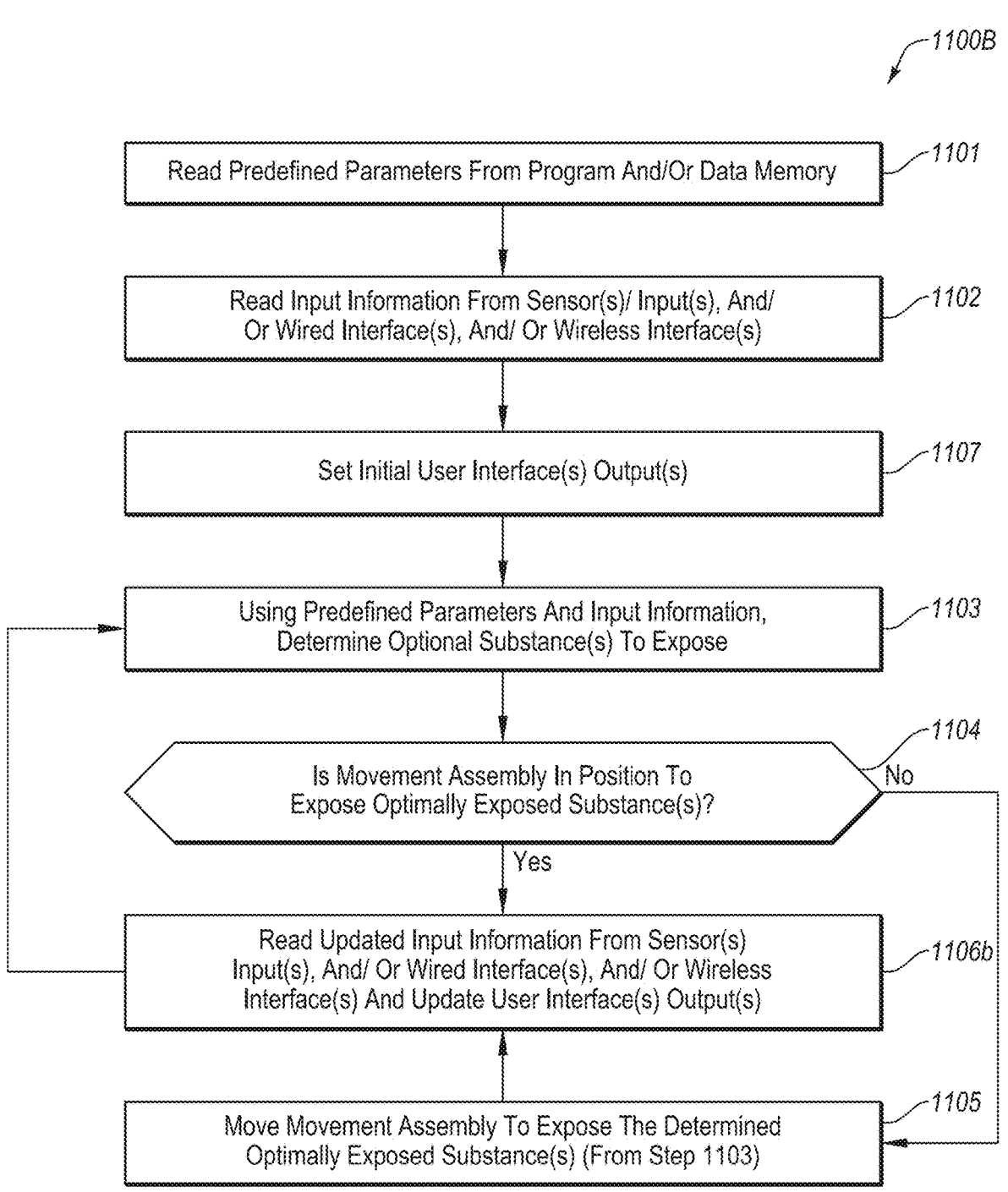

The flowchart 1100B illustrated in FIG. 11B shares common elements with the flowchart 1100A illustrated in FIG. 11A and provides a further exemplary embodiment that can be executed by a microprocessor/processor (e.g., as previously shown and described above with respect to FIG. 10C, and/or FIG. 13 below, and/or comprised within other embodiments). Turning to FIG. 11B, in addition to the corresponding steps that exist between the flowcharts shown in FIG. 11A and FIG. 11B, the flowchart in FIG. 11B shows an additional exemplary step to set the initial user interface(s) output(s) 1107. Relative to step 1106a as shown in the flowchart in FIG. 11A, flowchart FIG. 11B also shows a modified step 1106b used to not only read updated input information from the sensor(s)/input(s), and/or wired interface(s), and/or wireless interface(s), but also to update user interface(s) output(s) 1106b.

Such user interface(s) updates, via steps 1107 and 1106b, may be used to communicate/convey any one of the following conditions, but not limited to, by way of example: error, low battery/low energy, maintenance needed, replacement of substance(s)/assembly needed, replace the structure that includes one or more microchambers, and/or replace any other serviceable part. The indicators can also be used to communicate certain settings, for example, as feedback to a user to convey settings. Such user settings may include, for example, the selection of a desired species/subspecies, time, climate zone, or other input information. The use and functionality of the user interface(s) are further described above, for example, concerning FIG. 7B, FIG. 10B, FIG. 10C (and FIG. 13 below) and related description which is incorporated herein.

As previously discussed above, the user interface(s) updates can also occur via a remote user interface(s) enabled by the abovementioned low-cost wired or wireless transmitter (or transceiver) to communicate information to the user, any one of the following conditions, but not limited to, by way of example: error, low battery/low energy, replacement of substance needed, or other indication. Further, the low-cost wireless transmitter may communicate information to automatically order supplies, resolve an error, indicate low battery/low energy, the need to replace substance(s), the need to replace the structure that includes one or more sealed microchambers, or the need to replace any other serviceable part. Moreover, the wired or wireless transmitter (or transceiver) may communicate any other information to the user related to, for example, input information and derivatives thereof, as discussed above concerning FIG. 7B, FIG. 9, FIG. 10B, FIG. 10C, and FIG. 13 below, and other related description which is incorporated herein.

FIG. 12 shows an optional exemplary process for allowing the microprocessor (e.g., as previously shown and described above with respect to FIG. 10C, and/or FIG. 13 below, and/or comprised within other embodiments) to sleep to conserve power/energy. The sleep mode is used to, for example, prolong battery life or conserve the energy used from any other energy storage/producing component. At step 1200 a timer is used to determine if the microprocessor should wake up and resume enacting processes, for example, the processes illustrated in FIG. 11A and/or FIG. 11B discussed above. If it is determined that the sleep timer has expired (i.e., it is time to wake up), then the program flow proceeds to step 1201 such that the microprocessor comes out of sleep mode. As one skilled in the art would appreciate that such an implementation can be interrupt-driven, or may be inserted within the normal program flow—for example, with respect to FIG. 11A and/or FIG. 11B, between steps 1105 and 1106*a* and/or between steps 1105 and 1106*b*, and/or for example, between steps 1104 and 1106*a* and/or between steps 1104 and 1106*b*.

As previously mentioned, and expanded upon herein, it is noteworthy that the exemplary embodiments including those illustrated in FIG. 7A through FIG. 10C are not limited to a particular shape and may share elements between the various embodiments. For example, the exemplary embodiments as illustrated and described concerning FIG. 7A through FIG. 10C (or combinations thereof) can be adapted to fit within and/or replace any baiting system, trap, or other pest control apparatus. For example, embodiments of the present disclosure can be shaped as a disk similar in shape a that shown in the devices shown in FIG. 5 to take the place of the device shown in FIG. 5 as an improved device. Moreover, embodiments of the present disclosure can be miniaturized to fit within any new or conventional device, for example, within the devices shown in FIG. 3, FIG. 4, FIG. 5, FIG. 6, or other devices. Further, placement of the embodiments of the present disclosure within such devices can be at a number of different location(s) (e.g., the top, bottom, a side, mounted to a lid (or cover, wall, housing, etc.)) in a variety of orientations (e.g., upright, sideways, upside-down while mounted to a lid or other structure, etc.) based on the target pest(s).

Moreover, as previously discussed and further expanded upon herein, aspects of one exemplary embodiment may be combined with another exemplary embodiment to form yet another exemplary embodiment. For example, the microprocessor 1008, and/or user interface(s) 1014 of FIG. 10B or FIG. 10C, and/or communication interface(s) 1009 of FIG. 10C may just as well be used in the base assembly 710 of FIG. 7B as an exemplary embodiment, or with a similar base assembly combined with the alternative assemblies shown and described concerning FIG. 8, and/or FIG. 9, and/or FIG. 10B, and/or FIG. 10C. Also, the exemplary algorithms as shown in FIG. 11A, and/or FIG. 11B, and/or FIG. 12 may be executed on a microprocessor combined with any of the exemplary embodiments or other combined embodiments that comprise a microprocessor/processor including those combined with the computer system 1300 as shown in FIG. 13 (further discussed below.)

FIG. 13 illustrates an example computer system 1300 that may be employed in a pest control delivery system according to some embodiments of the present disclosure. In some embodiments, the computer system 1300 may be part of any of the systems or devices described in this disclosure. In some embodiments, all or part of the computer system 1300 may be an integral part of a pest control device. In other embodiments, all or part of the computer system 1300 may be separate from, but communicatively connected, to a pest control device.

The computer system 1300 may include a processor 1302, a memory 1304, a file system 1306, a communication unit 1308, an operating system 1310, a user interface 1312, and an application 1314, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 1302 may include any suitable special-purpose or general-purpose computer, computing entity, or processing device including various computer hardware or software applications and may be configured to execute instructions stored on any applicable computer-readable storage media. For example, the processor 1302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 1302 may interpret and/or execute program instructions and/or process data stored in the memory 1304 and/or the file system 1306. In some embodiments, the processor 1302 may fetch program instructions that are stored in memory 1304 which may further be the result of the file system 1306 loading the program instructions into the memory 1304. Based on the program instructions that are stored and/or loaded into memory 1304, the processor 1302 may execute the program instructions. In some embodiments, the instructions may include the processor 1302 performing one or more of the actions of the methods disclosed herein.

The memory 1304 and the file system 1306 may include computer-readable storage media for carrying or having stored thereon computer-executable instructions or data structures. Such computer-readable storage media may be any available non-transitory media that may be accessed by a general-purpose or special-purpose computer, such as the processor 1302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1302 to perform a certain operation or group of operations, such as one or more of the actions of the methods disclosed herein. These computer-executable instructions may be included, for example, in the operating system 1310, in one or more applications according to embodiments disclosed herein.

The communication unit 1308 may include any component, device, system, or combination thereof configured to transmit or receive information over a network, such as the Internet. In some embodiments, the communication unit 1308 may communicate with other devices at other locations, the same location, or even other components within the same system. For example, the communication unit 1308 may include a modem, a network card (wireless or wired), an infrared communication device, a wireless communication interface circuit and/or device (such as for Bluetooth®, 802.11, PAN, WAN, LAN, Metropolitan Area Network (MAN), WiFi®, WiMAX®, cellular communication, etc.), and/or the like that may further comprise, e.g., an antenna, and/or chipset. The communication unit 1308 may permit data to be exchanged with a network and/or any other devices or systems, such as those described in the present disclosure.

The operating system 1310 may e configured to manage hardware and software resources of the computer system 1300 and configured to provide common services for the computer system 1300.

The user interface 1312 may include any device configured to allow a user to interface with the computer system 1300. For example, the user interface 1312 may include a display, such as an LCD, LED, or other display, that is configured to present video, text, application user interfaces, and other data as directed by the processor 1302. The user interface 1312 may further include a mouse, a track pad, a keyboard, a touchscreen, volume controls, other buttons, a speaker, a microphone, a camera, any peripheral device, or other input or output device. The user interface 1312 may receive input from a user and provide the input to the processor 1302. Similarly, the user interface 1312 may present output to a user.

The application 1314 may be one or more computer-readable instructions stored on one or more non-transitory computer-readable media, such as the memory 1304 or the file system 1306, that, when executed by the processor 1302, is configured to perform one or more of the actions of the methods disclosed herein. In some embodiments, the application 1314 may be part of the operating system 1310 or may be part of an application of the computer system 1300, or may be some combination thereof.

Modifications, additions, or omissions may be made to the computer system 1300 without departing from the scope of the present disclosure. For example, although each is illustrated as a single component in FIG. 13, any of the components 1302-1314 of the computer system 1300 may include multiple similar components that function collectively and are communicatively coupled. Further, although illustrated as a single computer system, it is understood that the computer system 1300 may include multiple physical or virtual computer systems that are networked together, such as in a cloud computing environment, a multitenancy environment, or a virtualization environment.

As indicated above, the embodiments described herein may include the use of a special-purpose or general-purpose computer (e.g., the processor 1302 of FIG. 13) including various computer hardware or software applications, as discussed in greater detail above. Further, as indicated above, embodiments described herein may be implemented using computer-readable media (e.g., the memory 1304 or file system 1306 of FIG. 13) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general-purpose hardware), specific hardware implementations or a combination of software and specific hardware implementations are also possible and contemplated.

The various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, the color of the materials is not important, but the materials used may be of a coloration of yellow, green, red, or any other color to attract certain species that are drawn to such colors may be used.

The presence of broadening words and phrases such as "one or more," "at least," "but not limited to," "and/or," or other like phrases in some instances shall not be read to mean that the narrower case is intended or required in instances where such broadening phrases may be absent. The use of the terms "assembly," "modularizable," "elements," "aspects," and the like does not imply that the components or functionality described or claimed as part of the assembly (or elements, or modularizable components, etc.) are all configured in a common package and/or structure. Indeed, any or all of the various components of an assembly (or elements, or modularizable components, etc.), whether control logic or other components, can be combined in a single package or separately maintained and can further be distributed in multiple groupings or packages or across multiple locations within the overall system, method, and/or apparatus.

Additionally, embodiments of the present disclosure may entail additional applications in addition to those provided above, and therefore does exclude other applications. For example, embodiments of the present disclosure may be applied to other applications beyond pest control, including for the application for the optimal delivery of other substances. For example, but limited to, other applications may include the optimal delivery of scent(s)/fragrance(s), including the ability to seasonally change scents/fragrances within a home or business (winter scents/fragrances, fall scents/fragrances, etc.). As yet another example, embodiments of the present disclosure may be applied to include the application of other substances that for instance contain scent/fragrances, including seasonally changing scents/fragrances within a vehicle, that may be optimized to change with respect to, for example, warm weather, versus cold weather, and the like.

The invention claimed is:

1. A pest control substance delivery device comprising:
a first microchamber that is configured to hold a first pest attractant;
a second microchamber that is configured to hold a second pest attractant, wherein the second pest attractant is different from the first pest attractant;
a sensor configured to receive condition information;
a processor configured to receive the condition information from the sensor and use the condition information to determine which one of a first condition and a second condition is met, wherein the processor is configured to provide a first command signal that indicates the first condition is met and provide a second command signal that indicates the second condition is met; and
an actuator coupled to the processor and configured to actuate an aperture assembly that allows access to the first microchamber in response to the first command signal and allows access to the second microchamber in response to the second command signal; wherein at least one of the first and second conditions comprises a specified temperature trend or a specified number of light hours in a day or a specified change in a number of light hours in a day.

2. The pest control substance delivery device of claim 1, wherein the first and second pest attractants are poisons.

3. The pest control substance delivery device of claim 1, wherein at least one of the first and second pest attractants is a solid.

4. The pest control substance delivery device of claim 1, wherein at least one of the first and second pest attractants is a liquid.

5. The pest control substance delivery device of claim 1, further comprising a memory configured to store data defining the first condition and the second condition.

6. The pest control substance delivery device of claim 1, further comprising a wireless receiver configured to receive data defining the first condition and the second condition.

7. The pest control substance delivery device of claim 1, wherein at least one of the first and second conditions is a specified season of a year and the sensor is configured to receive environmental or temporal information indicative of a season of the year.

8. The pest control substance delivery device of claim 1, wherein at least one of the first and second conditions is a specified ambient temperature range and the sensor is configured to receive temperature information indicative of an ambient temperature at or near the pest control substance delivery device.

9. The pest control substance delivery device of claim 1, wherein at least one of the first and second conditions is the specified temperature trend, and wherein the sensor is a temperature sensor.

10. The pest control substance delivery device of claim 1, wherein at least one of the first and second conditions is the specified change in a number of light hours in a day, and wherein the sensor is a light sensor.

11. The pest control substance delivery device of claim 1, wherein at least one of the first and second conditions is the specified change in a number of light hours in a day.

12. The pest control substance delivery device of claim 1, wherein the first condition includes an indication of indoor use of the pest control substance delivery device, the second condition includes an indication of outdoor use of the pest control substance delivery device.

13. The pest control substance delivery device of claim 1, wherein at least one of the first and second conditions is a specified geographic location of the pest control substance delivery device and the sensor is configured to sense an actual geographic location of the pest control substance delivery device.

14. The pest control substance delivery device of claim 1, wherein at least one of the first and second conditions is a presence of a specified pest species and the condition information from the sensor includes information about a presence of the specified pest species.

15. The pest control substance delivery device of claim 1, wherein the first pest attractant is selected to attract a target pest species during a first active lifecycle of the target pest species and the second pest attractant is selected to attract the target pest species during a second active lifecycle of the target pest species.

16. The pest control substance delivery device of claim 1, wherein the first pest attractant is an attractant for a first target pest species the second pest attractant is an attractant for a second target pest species.

17. The pest control substance delivery device of claim 1, wherein the first condition is a specified amount of time that the aperture assembly allows access to the first microchamber and the sensor is configured to sense an actual amount of time that the aperture assembly has allowed access to the first microchamber.

18. The pest control substance delivery device of claim 17, wherein the specified amount of time is based on a shelf-life of the first pest attractant.

19. A pest control substance delivery device comprising:
a first chamber that is configured to hold a first pest attractant, wherein access to the first chamber is selectively allowed only when a first condition is met and disallowed when at least a second condition is met;
a second chamber that is configured to hold a second pest attractant, wherein access to the second chamber is selectively allowed only when a third condition is met and disallowed when at least a fourth condition is met;
a sensor that collects data for determining whether the first, second, third, and fourth conditions are met;
a processor configured to receive the data from the sensor and use the data from the sensor to determine which of the first, second, third, and fourth conditions is met; and
an actuator configured to receive instructions from the processor and, in response to the instructions, actuate an aperture assembly based on information from the processor about which of the first, second, third, or fourth condition is met, wherein the actuator is configured to actuate the aperture assembly to:
automatically allow access to the first chamber when the first condition is met,
automatically disallow access to the first chamber when the second condition is met,
automatically allow access to the second chamber when the third condition is met, and
automatically disallow access to the second chamber when the fourth condition is met; wherein at least one of the first or second or third or fourth conditions comprises a specified temperature trend or a specified number of light hours in a day or a specified change in a number of light hours in number of light hours in a day.

20. A pest control substance delivery device comprising:
a first compartment configured to hold a first pest attractant;
a second compartment configured to hold a second pest attractant;

an actuator configured to actuate an aperture assembly that selectively allows access to the first compartment when a first condition is met and allows access to the second compartment when a second condition is met, wherein at least one of the first and second conditions comprises a specified temperature trend or a specified number of light hours in a day or a specified change in a number of light hours in a day; a temporal-environmental condition sensor and a processor configured to use the sensed information from the sensor to determine whether the first condition is met and whether the second condition is met, wherein the determination includes correlating current sensed temporal-environmental conditions with stored data representing historical feeding patterns or attractant preferences of a target pest species during different lifecycle stages; and in response to instructions from the processor, wherein the instructions are based on the determination by the processor about whether the first or second condition is met, the actuator is configured to actuate the aperture assembly to allow access to the first pest attractant in the first compartment when the first condition is met and to allow access to the second pest attractant in the second compartment when the second condition is met.

21. A pest control device comprising:

a first microchamber that is configured to hold a first pest attractant;

a second microchamber that is configured to hold a second pest attractant, wherein the second pest attractant is different from the first pest attractant;

a sensor configured to receive condition information;

hardware control logic configured to receive the condition information from the sensor and use the condition information to determine which one of a first condition and a second condition is met, wherein the hardware control logic is configured to provide a first command signal that indicates the first condition is met and provide a second command signal that indicates the second condition is met; and an actuator coupled to the hardware control logic and configured to actuate an aperture assembly that allows access to the first microchamber in response to the first command signal and allows access to the second microchamber in response to the second command signal, wherein at least one of the first and second conditions comprises a specified temperature trend or a specified number of light hours in a day or a specified change in a number of light hours in a day.

22. The pest control device of claim 21, wherein the first condition or the second condition is one of a specified season of a year, a specified ambient temperature range, a specified geographic location of the pest control device, an indication of a presence of a specified pest species, and wherein the sensor is configured to sense information about a corresponding one of the season of a year, the temperature range, the geographic location of the pest control device, and the presence of a specified pest species.

23. The pest control device of claim 21, wherein:

the first pest attractant is selected to attract a target pest species during a first active lifecycle of the target pest species and the second pest attractant is selected to attract the target pest species during a second active lifecycle of the target pest species; or the first pest attractant is an attractant for a first target pest species and the second pest attractant is an attractant for a second target pest species.

* * * * *